(12) United States Patent
Chen

(10) Patent No.: US 11,796,808 B2
(45) Date of Patent: Oct. 24, 2023

(54) DIRECTIONAL BACKLIT DISPLAY DEVICE WITH EYE TRACKING

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 0 days.

(21) Appl. No.: 17/667,842

(22) Filed: Feb. 9, 2022

(65) Prior Publication Data

US 2023/0111590 A1 Apr. 13, 2023

(30) Foreign Application Priority Data

Oct. 13, 2021 (TW) .................................. 110137866

(51) Int. Cl.
| | |
|---|---|
| G02B 27/01 | (2006.01) |
| G02B 30/33 | (2020.01) |
| G02B 5/02 | (2006.01) |
| G02B 26/08 | (2006.01) |
| G02B 27/00 | (2006.01) |

(52) U.S. Cl.
CPC ....... G02B 27/0101 (2013.01); G02B 5/0284 (2013.01); G02B 26/0816 (2013.01); G02B 27/0093 (2013.01); G02B 30/33 (2020.01); G02B 2027/0143 (2013.01)

(58) Field of Classification Search
CPC ... G02B 27/00–0189; G02B 2027/0105–0198; G02B 30/33; G02B 5/0284; G02B 26/0816; H04N 9/31–3197; G03B 21/00–64
See application file for complete search history.

(56) References Cited

U.S. PATENT DOCUMENTS

| | | | | |
|---|---|---|---|---|
| 2009/0303158 | A1* | 12/2009 | Takahashi | G02B 27/01 345/7 |
| 2012/0099032 | A1* | 4/2012 | Ishikawa | G02B 27/0101 349/11 |
| 2014/0022362 | A1* | 1/2014 | Oellers | H04N 13/366 348/60 |
| 2016/0320624 | A1* | 11/2016 | Yamaoka | B60K 37/04 |

(Continued)

*Primary Examiner* — Bao-Luan Q Le
*Assistant Examiner* — Christopher A Lamb, II
(74) *Attorney, Agent, or Firm* — GUICE PATENTS PLLC

(57) ABSTRACT

A directional backlit display device includes a light source module, a reflective narrow-angle diffuser, a backlit display device panel, an eye tracking device, and a controller. The diffuser includes a shaft and is utilized to reflect and uniformly diffuse the light to provide a uniform directional light beam. The backlit display device panel is included on the projecting optical path of the uniform directional light beam. The uniform directional light beam illuminates an image displayed on the backlit display device panel and projects to a projection area. The controller receives an eye position information from the eye tracking device and determines a coordinate. The controller determines a corrective projection area when the coordinate deviates from the projection area, and the drive module rotates the reflective narrow-angle diffuser around an axis of the shaft according to the corrective projection area, so the image projection area moves with the eye.

13 Claims, 19 Drawing Sheets

(56) References Cited

U.S. PATENT DOCUMENTS

| | | | | |
|---|---|---|---|---|
| 2016/0362002 A1* | 12/2016 | Aoki | ...................... | B60K 35/00 |
| 2017/0205876 A1* | 7/2017 | Vidal | ...................... | G01S 17/87 |
| 2021/0003839 A1* | 1/2021 | Huang | ............... | G02B 27/0103 |
| 2021/0072552 A1* | 3/2021 | Kobayashi | ......... | G02B 27/0101 |

* cited by examiner

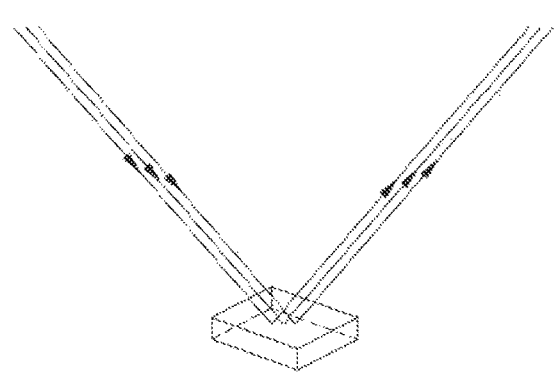
FIG.2A
PRIOR ART
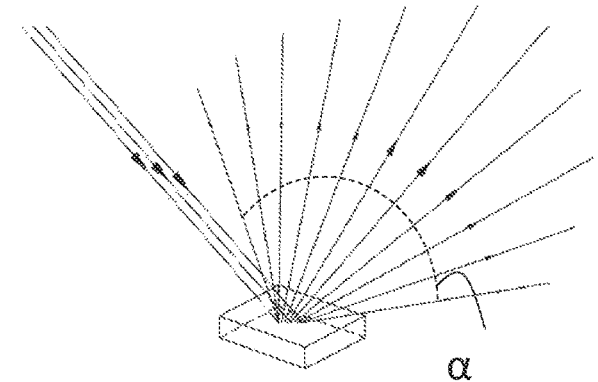
FIG.2B
PRIOR ART
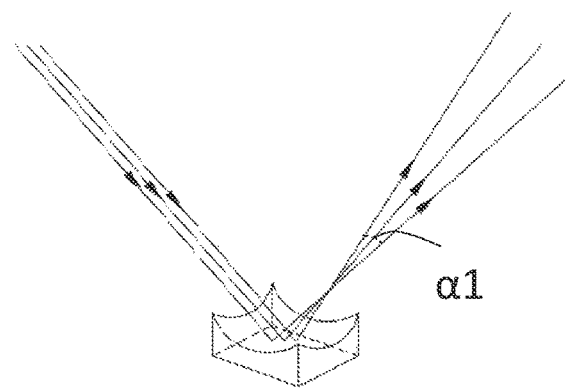
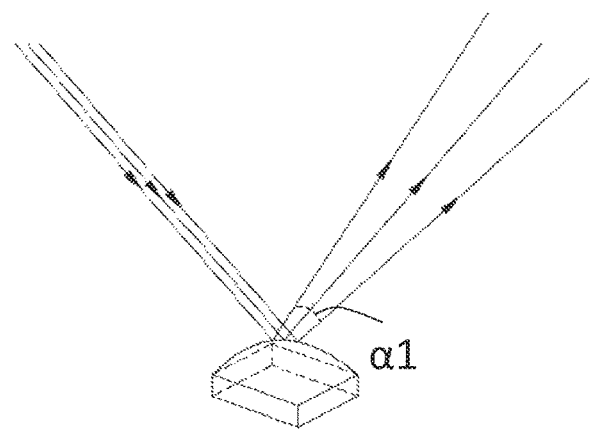
FIG.2C
PRIOR ART

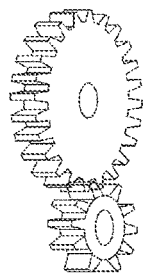 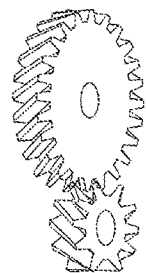 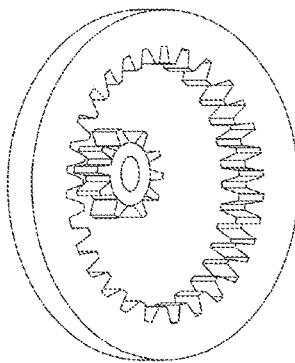 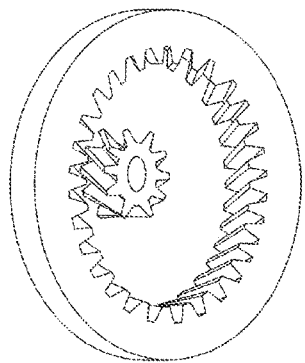
FIG.12A  FIG.12B  FIG.12E  FIG.12F
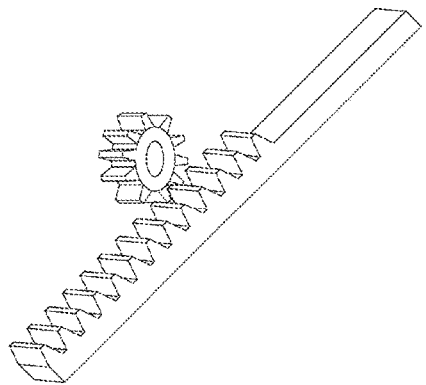 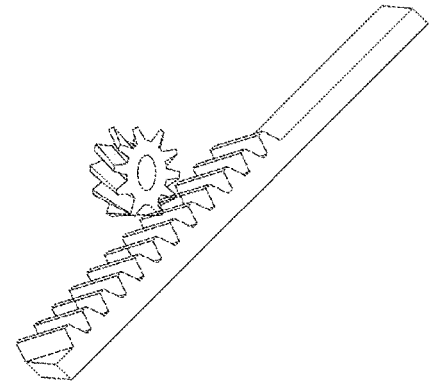
FIG.12C  FIG.12D
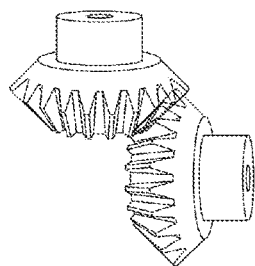 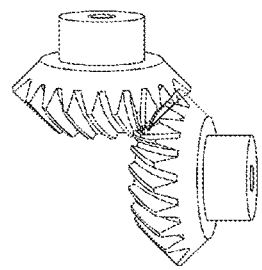 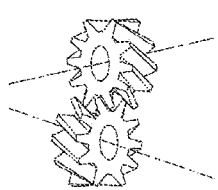 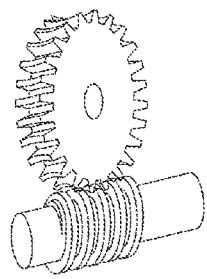
FIG.12G  FIG.12H  FIG.12I  FIG.12J

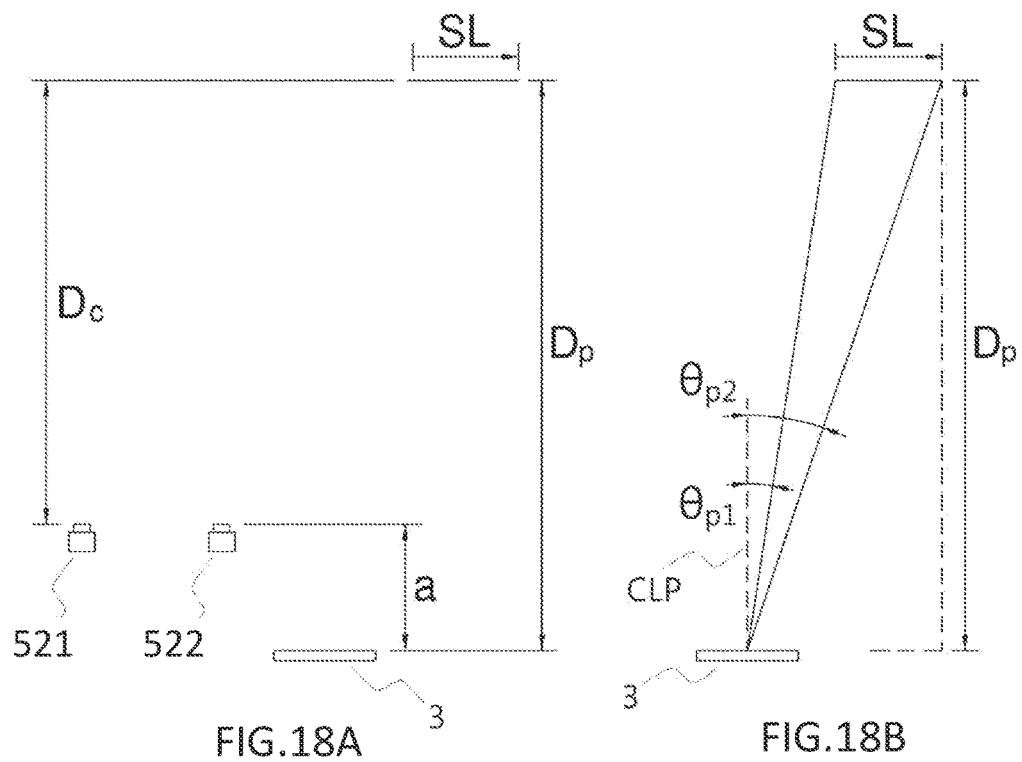
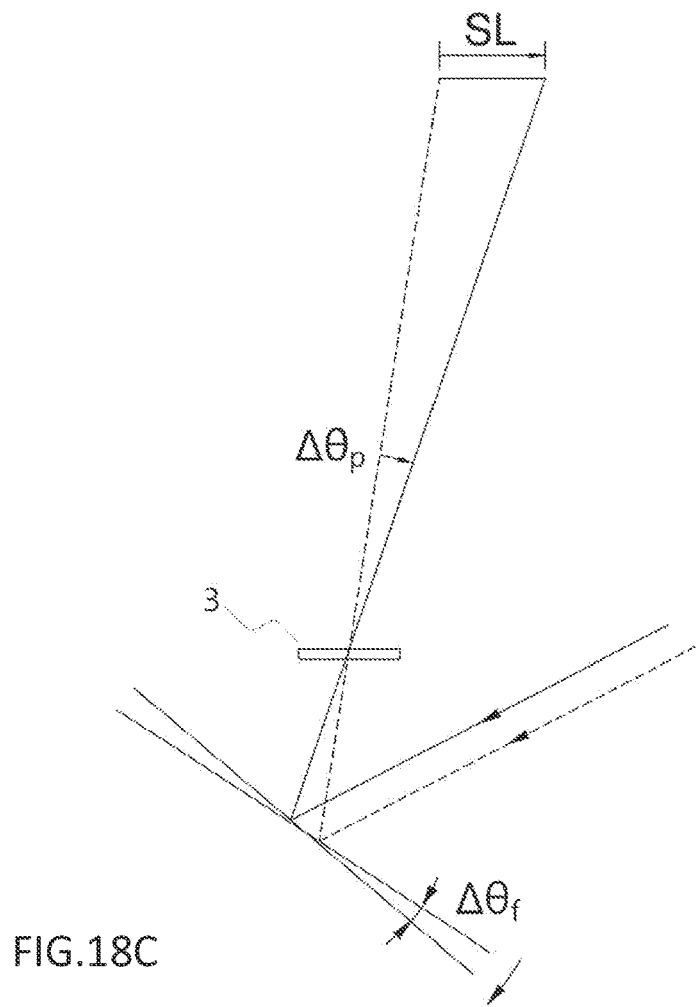
FIG.18A  FIG.18B
FIG.18C

DIRECTIONAL BACKLIT DISPLAY DEVICE WITH EYE TRACKING

BACKGROUND

Technical Field

The present disclosure is directed to a directional backlit display device with eye tracking.

Related Art

Please refer to FIG. 1, a reflective narrow-angle diffuser 2 has an array composed of a plurality of micro curved mirrors 21 laid out in a square arrangement or hexagonal honeycomb arrangement. Each micro curved mirror 21 sizes in a range of 2.5 µm~0.25 mm. The micro curved mirror 21 is a micro-concave mirror or a micro-convex mirror. The reflective narrow-angle diffuser 2 is a flat surface or a curved surface. Each micro curved mirror 21 is provided with identical or non-identical curvatures and angles.

The quantity of the micro curved mirrors of the reflective narrow-angle diffuser can be customized according to the resolution and optical path design requirements.

Please refer to FIG. 2A, a flat-surfaced reflector is characterized with a smooth and flat surface, an angle of incidence of an incident light equals to an angle of reflection of a reflected light, so the spread angle of the beam remains unchanged, there is no diffusion effect, and the viewing angles is limited.

Please refer to FIG. 2B, a projection screen is a flat surface. In order to allow observers from all angles to see the projected image, a wide scattering surface is required to diffuse the light projected on the plane in all directions, but at the same time, the brightness of the image observed by the observers is greatly reduced.

Please refer to FIG. 2C, the micro curved mirrors of the reflective narrow-angle diffuser can diffuse incident light toward a preset direction with preset and narrow diffusion angle α 1, so it can significantly increase the brightness of observing images within the range of the preset direction and the diffusion angle. Among them, the reflective surface of the micro curved mirror can be concave or convex.

SUMMARY

Please refer to FIG. 3, a light source module 1 projects a light L to the reflective narrow-angle diffuser 2, the array of the micro curved mirrors 21 of the reflective narrow-angle diffuser 2 direct the projected light to a preset direction, reflecting and diffusing the light with a narrow angle diffusion to provide a uniform directional light beam D, the uniform directional light beam D penetrates a backlit display device panel 3 (e.g., a LCD) to provide a uniform directional image light beam DI, and then the uniform directional image light beam DI projects to a projection area (i.e., an eye box E).

The diffusion angle of the uniform directional image light beam of FIG. 3 is very small, brightness being concentrated, so a low-wattage light source is utilized to provide enough and very high brightness. However, due to the small projection area (i.e., the eye box E), once the observer moves his body or head, or alternating to a different observer at the same place, the eyes of the observer are very likely to exceed the preset projection area (i.e., the eye box E).

The present disclosure provides a directional backlit display device with eye tracking by moving a projection area to track eyes of an observer, so the observer sees a full image at various positions. Please refer to FIG. 4A, a reflective narrow-angle diffuser 2 reflects and diffuses a uniform directional light beam D, a cross-sectional area of the uniform directional light beam D being greater than a backlit display device panel 3. When the backlit display device panel 3 is fixed, by rotating an angle of the reflective narrow-angle diffuser, the uniform directional light beam D changes a projecting direction, the uniform directional light beam D penetrating the backlit display device panel 3 to provide a uniform directional image light beam DI, and then the uniform directional image light beam DI projects to a different projecting direction. Please refer to FIG. 4B, when the reflective narrow-angle diffuser 2 rotates upward at $\theta_1°$, the uniform directional image light beam D turns upward at $\theta_{10}$. $\theta_{10}$ equals to two times of $\theta_1$. Please refer to FIG. 4C, when the reflective narrow-angle diffuser 2 rotates downward at $\theta_2°$, the uniform directional image light beam D turns downward at $\theta_{20}$. $\theta_{20}$ equals to two times of $\theta_2$. As long as a range of rotating angle enables the uniform directional light beam D to project to an entire image I displayed on the backlit display device panel 3, the position of the eye box moves by changing a projecting angle of the image I.

Please refer to FIG. 5, when the reflective narrow-angle diffuser 2 rotates upward, downward, to left and to right respectively, the uniform directional image light beam D projects to the corresponding projecting direction to make the eye box E move to the corresponding direction.

The present disclosure is directed to a directional backlit display device with eye tracking comprises the following.

A Light Source Module Projects a Light.

A reflective narrow-angle diffuser comprises a shaft controlled by a drive module and an array of a plurality of micro curved mirrors. The array of the plurality of micro curved mirrors of the reflective narrow-angle diffuser reflect the light and uniformly diffuses the light with a narrow diffusion angle to provide a uniform directional light beam.

A backlit display device panel is included on a projecting optical path where the reflective narrow-angle diffuser projects the light to an observer. The backlit display device panel displays an image. The uniform directional light beam penetrates the backlit display device panel to provide a uniform directional image light beam. The uniform directional image light beam projects to a projection area of the observer (i.e., the eye box E).

An eye tracking device detects a position of an eye of the observer to provide position information.

A controller receives the eye position information from the eye tracking device to obtain an eye coordinate. When the eyes of the observer deviate the center of the projection area and the deviation exceeds a preset threshold, the controller determines a corrective projection area corresponding to the deviating eye coordinate, and then driving the drive module to rotate the reflective narrow-angle diffuser around an axis of the shaft to change an incident angle at which the light of the light source module projects to the reflective narrow-angle diffuser, so the uniform directional light beam projects to the corrective projection area.

In some embodiment, the eye tracking device detects a position of both eyes of one observer to provide the position information, the controller determines a center coordinate according to the position information of the position of the both eyes of the observer. When the center coordinate deviates the center of a projection area and the deviation exceeds a preset threshold, the controller determining a corrective projection area according to the deviating eye coordinate.

In some embodiment, the reflective narrow-angle diffuser and the drive module are installed on the base. The base comprises a second shaft being controlled by a second drive module. The second drive module drives the reflective narrow-angle diffuser to rotate around an axis of the second shaft.

In some embodiment, the reflective narrow-angle diffuser rotates around the axis of the shaft and the axis of the second shaft simultaneously.

In some embodiment, a windshield is included in a projecting optical path of the uniform directional image light beam for blending a virtual image and a scenery in front of the observer, so the observer sees both the virtual image and the scenery in the front simultaneously.

In some embodiment, a concave minor is positioned between the windshield and the backlit display device panel in a projecting optical path of the uniform directional image light beam.

In some embodiment, a power transmission between the drive module and the reflective narrow-angle diffuser is gear transmission.

In some embodiment, a power transmission between the second drive module and the base is gear transmission.

In some embodiment, the power transmission between the drive module and the reflective narrow-angle diffuser is based on flexible transmission element.

In some embodiment, the power transmission between the second drive module and the base is based on flexible transmission element. The power transmission between the drive module and the reflective narrow-angle diffuser and the power transmission between the second drive module and the base are identical or non-identical.

In some embodiment, the eye tracking device comprises an infrared light source and two infrared cameras.

In some embodiment, the eye tracking device comprises an infrared light source, an infrared camera and a distance sensor.

BRIEF DESCRIPTION OF THE DRAWINGS

FIG. 2A, FIG. 2B and FIG. 2C are schematic diagrams illustrating a projected light being diffused at various reflecting surfaces;

FIG. 12A-FIG. 12J are schematic diagrams of a gear transmission;

FIG. 18A, FIG. 18B and FIG. 18C are schematic diagrams illustrating determining a position of moving eyes and rotating the reflective narrow-angle diffuser;

DETAILED DESCRIPTION

Figure 1:
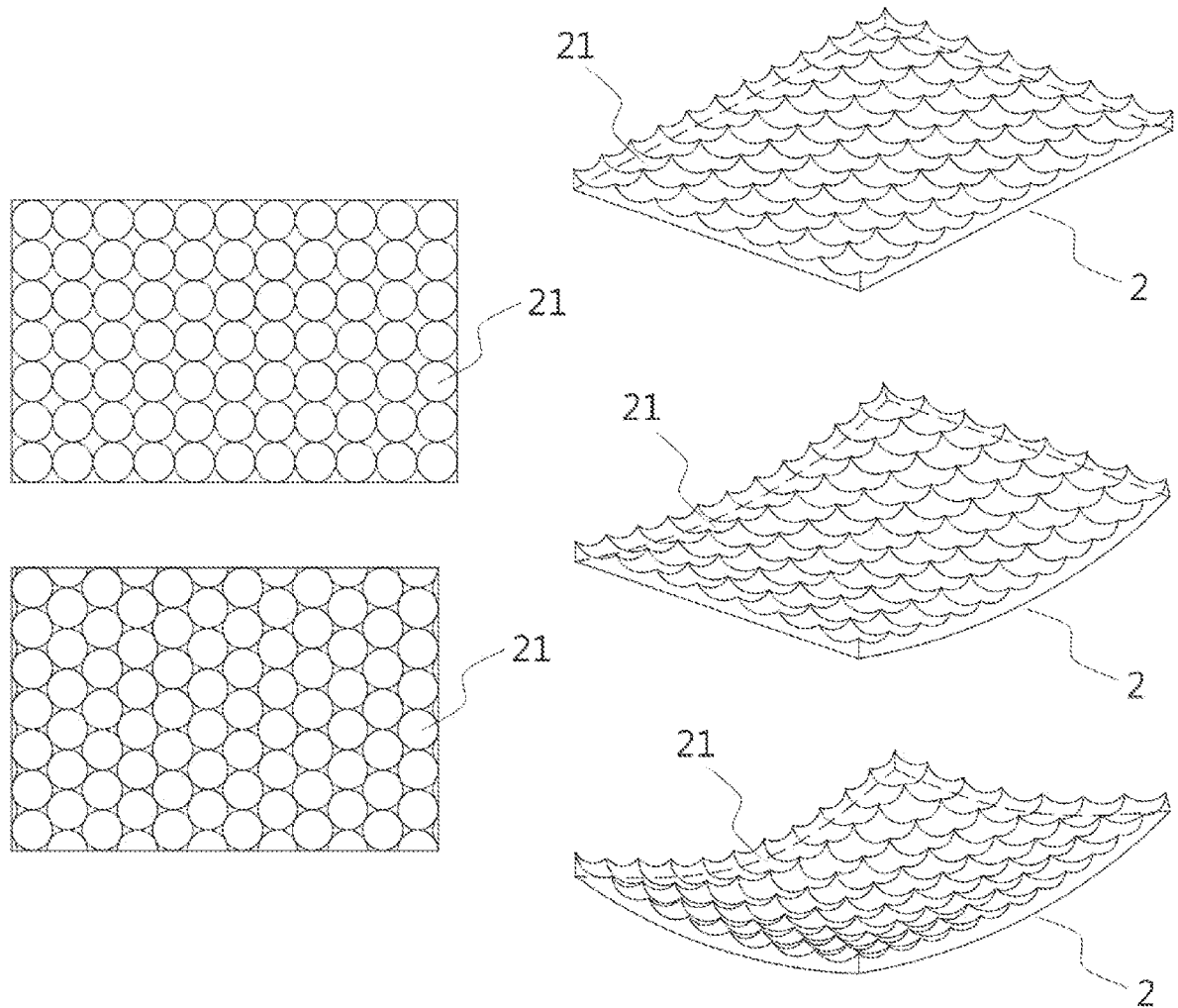
FIG. 1 is a schematic diagram of a conventional art.
Figure 3:
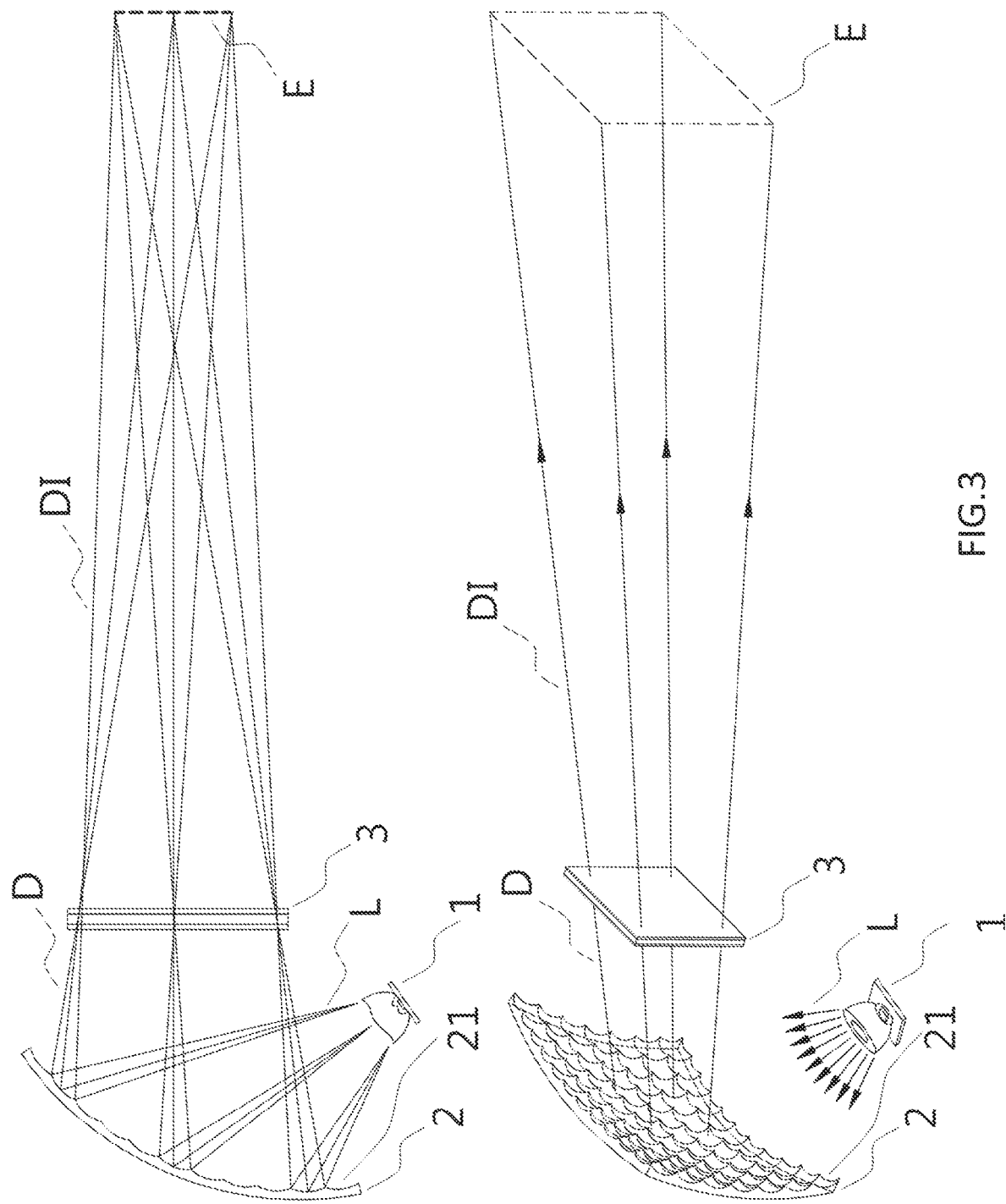
FIG. 3 is a schematic diagram of another conventional art.
Figure 4C:
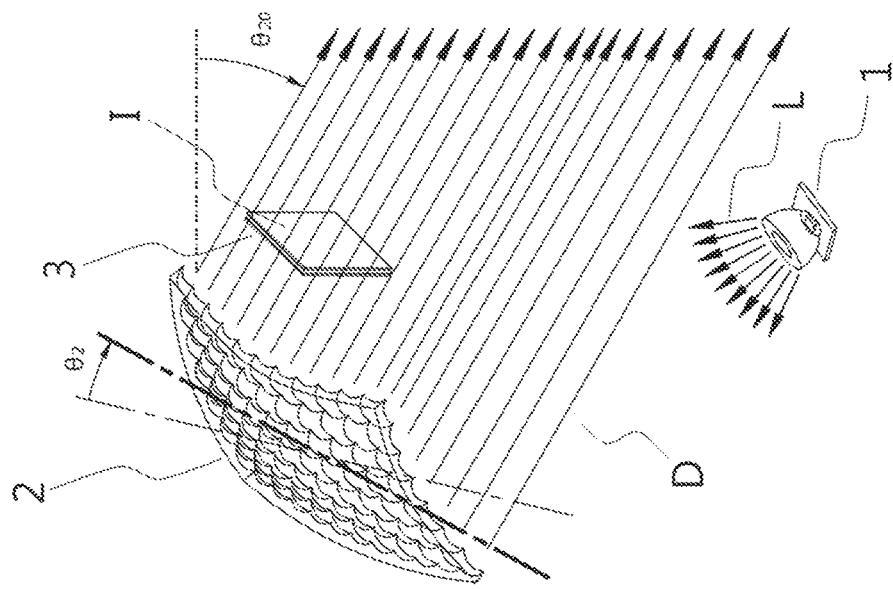
FIG. 4A, FIG. 4B and FIG. 4C are schematic diagrams of the reflected and diffused light beam of the reflective narrow-angle diffuser and a backlit display device panel.
Figure 4B:
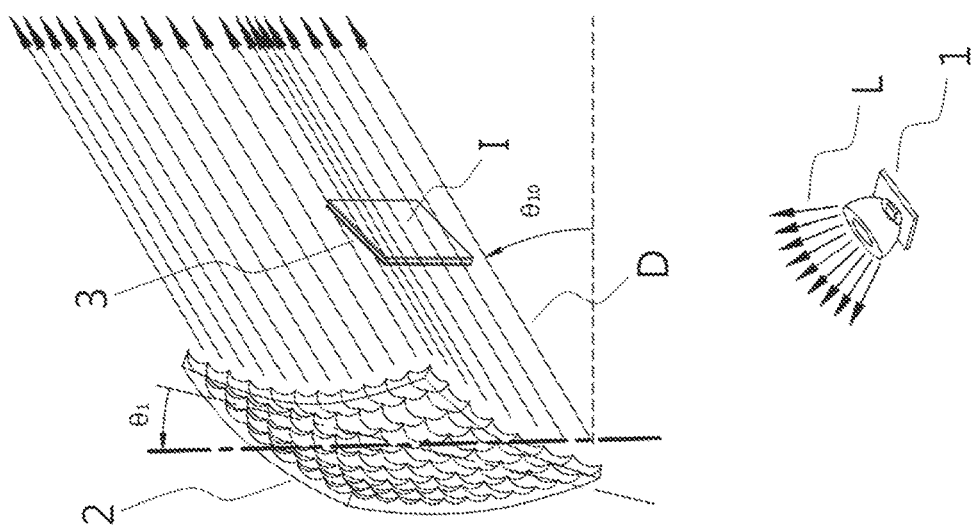
Figure 4A:
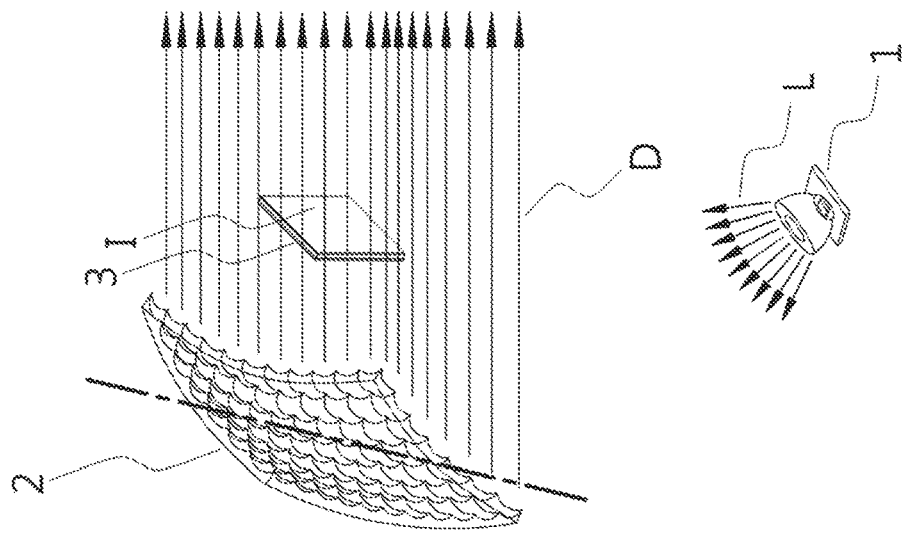
Figure 5:
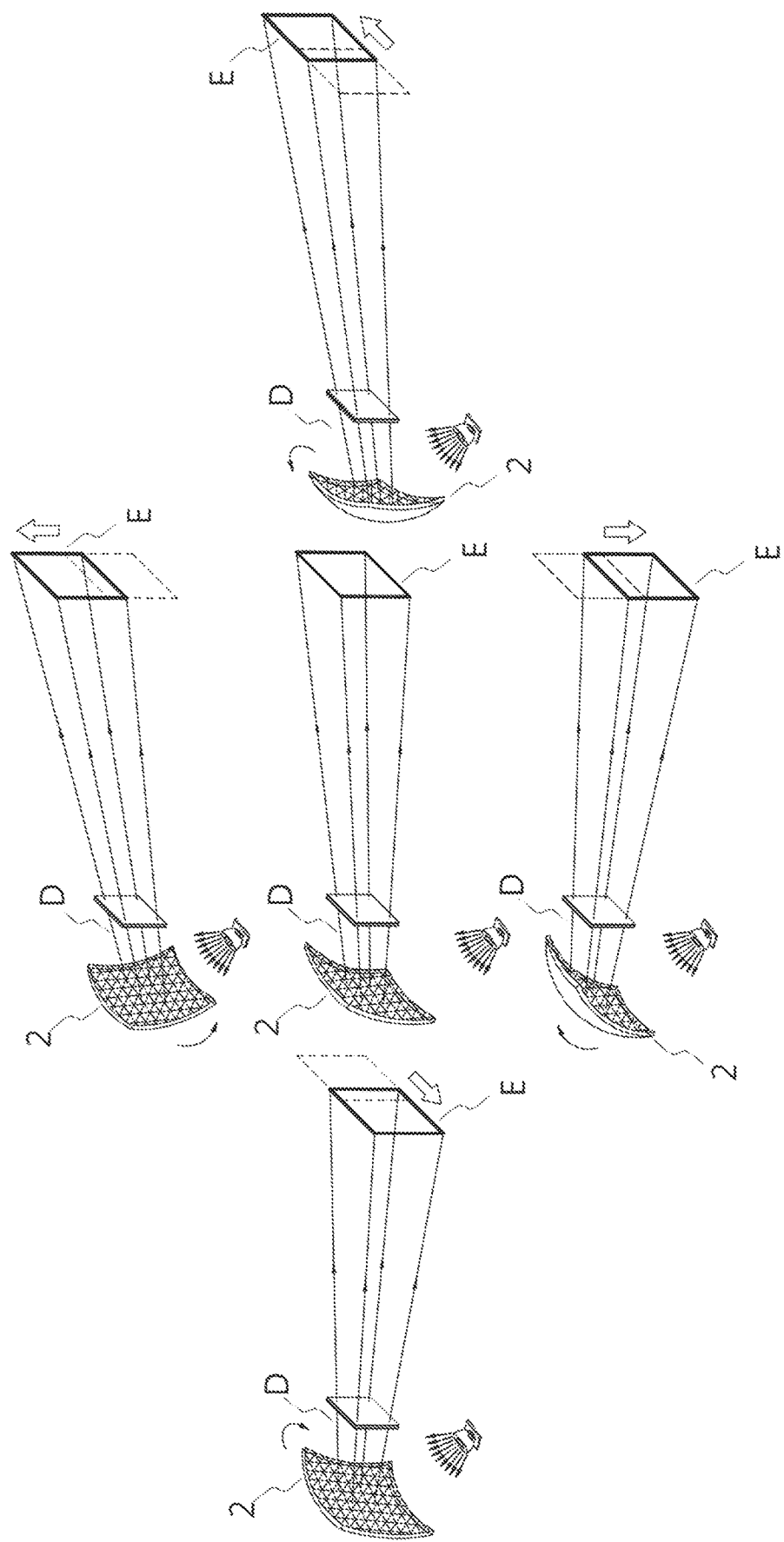
FIG. 5 is a schematic diagram illustrating the reflective narrow-angle diffuser rotating and a projection area moving with the reflective narrow-angle diffuser.
Figure 6:
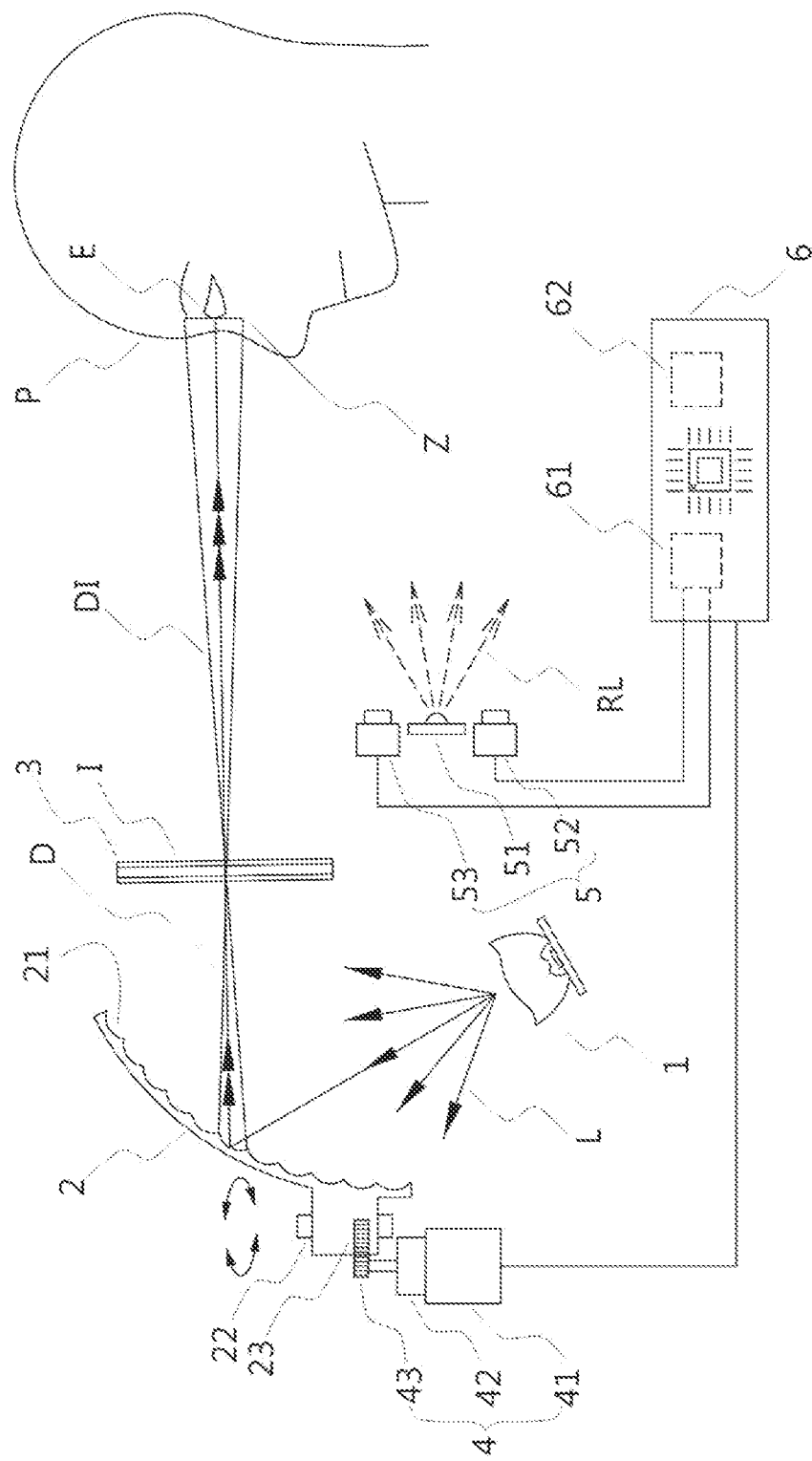
FIG. 6 is a schematic diagram according to some embodiment of the present disclosure.

Please refer to FIG. 6, according to some embodiment of the present disclosure, there is provided a directional backlit display device with eye tracking comprising a light source module 1 projects a light L, a reflective narrow-angle diffuser 2, a backlit type display panel 3, a drive module 4, an eye tracking device 5 and a controller 6.

The reflective narrow-angle diffuser 2 comprises a shaft 22 and an input gear 23. The reflective narrow-angle diffuser 2 is provided with a plurality of micro curved mirrors 21 laid out in an array served as a reflecting surface. The micro curved mirrors array of the reflective narrow-angle diffuser 2 reflects the light L and uniformly diffuses the light L with a narrow diffusion angle to provide a uniform directional light beam D.

The backlit display device panel 3 is included in a projecting optical path of the uniform directional light beam D (i.e., in a projecting direction of the uniform directional light beam D). The backlit display device panel 3 displays an image I. The uniform directional light beam D penetrates the backlit display device panel 3 illuminating the image I to provide a uniform directional image light beam DI, and then the uniform directional image light beam DI projects to a projection area (i.e., an eye box Z of the observer P).

The drive module 4 comprises a motor 41 and a reduction gear assembly 42. The motor 41 engages with the reduction gear assembly 42. The reduction gear assembly 42 comprises an output gear 43. The output gear 43 meshes with the input gear 23 of the reflective narrow-angle diffuser 2. The motor 41 utilizes the reduction gear assembly 42 to drive the output gear 43, driving the reflective narrow-angle diffuser 2 to rotate around an axis of the shaft 22.

The eye tracking device 5 comprises an infrared light source 51 and an infrared camera 52 and a distance sensor 53. The infrared light source 51 projects an infrared light RL to the observer P, the infrared camera 52 capturing the reflected infrared light RL by the observer P to provide an infrared image signal, and then the distance sensor 53 obtains a distance signal served as a distance between the head of the observer P and the distance sensor 53.

The controller 6 comprises a processor, an algorithm and a motor control circuit. The eye tracking device 5 provides the infrared image signal and the distance signal to the controller 6 served as a position information 61 of the eyes E of the observer P (i.e., eye position information). The controller 6 utilizes algorithm for image recognition and location coordinates to obtain a coordinate 62 of the eyes E of the observer P. When the coordinate 62 of the eyes E deviates a center coordinate of the eye box Z, and the deviation exceeds a preset threshold, the controller 6 determines a corrective projection area (i.e., the latest position of the eyes) and a rotating angle required by using the latest position of the reflective narrow-angle diffuser 2 as a reference, so the projection area moves to the corrective projection area. The controller 6 drives the drive module 4 to rotate the reflective narrow-angle diffuser 2, changing an incident angle at which the light L of the light source module 1 projects to the reflective narrow-angle diffuser 2 to change a projecting direction of the uniform directional light beam D, so the projection area (the eye box Z) of the uniform directional image light beam DI moves to the corrective projection area for tracking the eyes. The preset threshold is served to avoid driving the reflective narrow-angle diffuser 2 too frequently and to reduce loading of the processor and noises from the motor. Only when the position of the eyes E of the observer P moves significantly and is about to leave the projection area (i.e., the eye box Z of the observer P), the reflective narrow-angle diffuser rotates to adjust the projection area.

In some embodiment, the eye tracking device 5 comprises an infrared light source 51, two infrared cameras 52. The infrared light source 51 projects an infrared light RL to the observer P, two infrared cameras 52 capturing the reflected infrared light RL by the observer P to provide two infrared images signal. The eye tracking device 5 provides the infrared image signals to the controller 6 served as a position information 61 of the eyes E of the observer P. The controller 6 utilizes image recognition and algorithm for location coordinates to obtain a coordinate 62 of the eyes E of the observer P.

Figure 7:
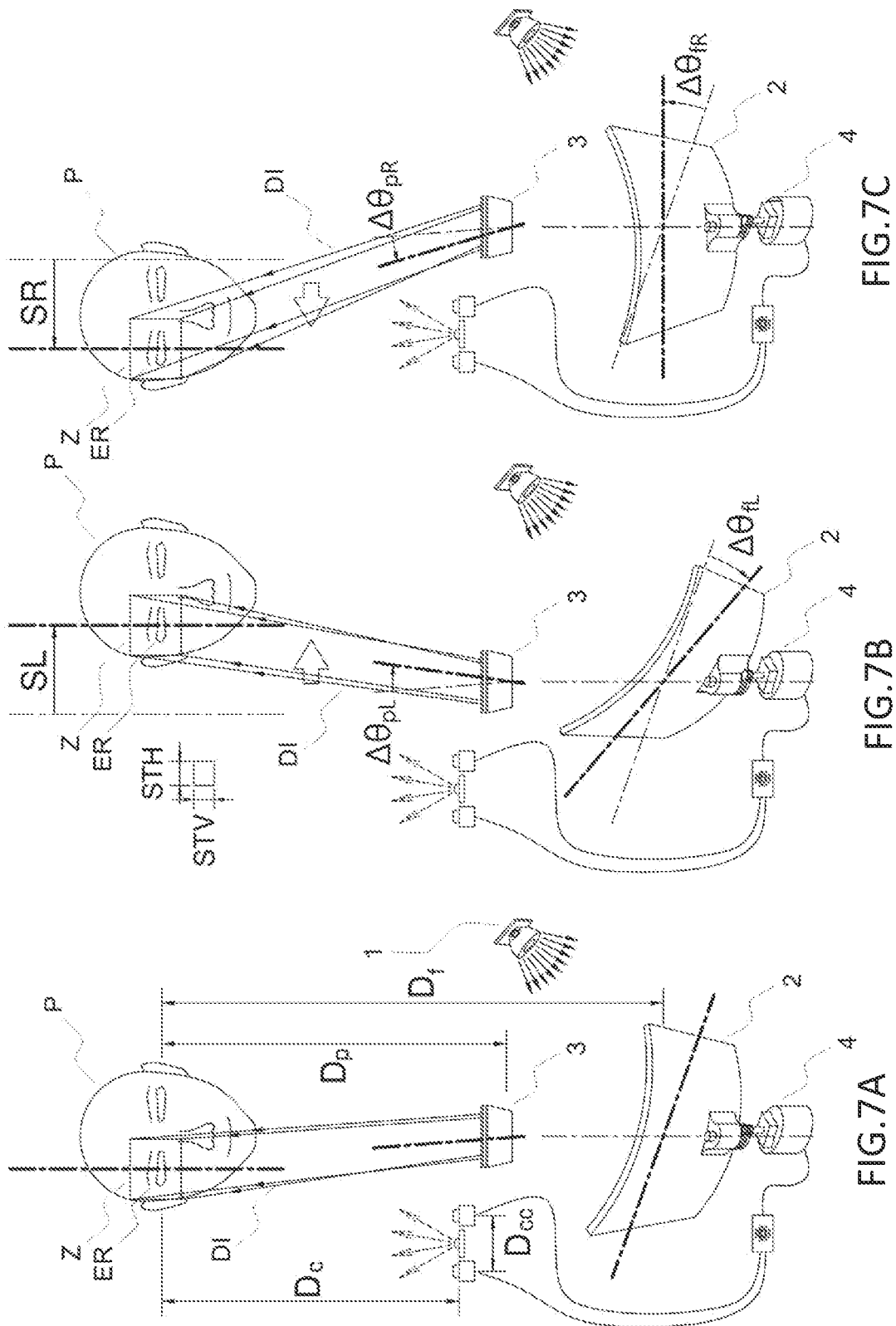
FIG. 7A, FIG. 7B and FIG. 7C are schematic diagrams of a single-eyed tracking according to some embodiment of the present disclosure.

Please refer to FIG. 7A, a range of the eye box Z only covers a right eye ER, the reflective narrow-angle diffuser 2 reflecting to provide the uniform directional light beam, the uniform directional light beam penetrating the backlit display device panel 3 to provide the uniform directional image light beam DI, the center of the projection area (the eye box Z) being located at the right eye ER of the observer P. Please refer to FIG. 7B, when the eye tracking device 5 detects the right eye ER of the observer P moving to left at a distance SL and the distance SL is greater than a horizontal shifting threshold STH, e.g., 2 cm, the drive module 4 driving the reflective narrow-angle diffuser 2 to rotate to left at $\Delta\theta_{fL°}$, the uniform directional image light beam DI penetrating the backlit display device panel 3 turning left at $\Delta\theta_{pL°}$, maintaining the center of the projection area Z at the right eye ER of the observer P. Please refer to FIG. 7C, when the eye tracking device 5 detects the right eye ER of the observer P moving to right at a distance SR, the drive module 4 driving the reflective narrow-angle diffuser 2 to rotate to right at $\Delta\theta_{fR°}$, the uniform directional image light beam DI penetrating the backlit display device panel 3 turning right at $\Delta\theta_{pR°}$, maintaining the center of the eye box Z at the right eye ER of the observer P. In this way, the eye tracking device 5 keeps detecting and tracking changes of the position of the right eye ER of the observer P to adjust the projecting position of the eye box Z, so that the image viewed by the observer P is continuous.

Figure 8:
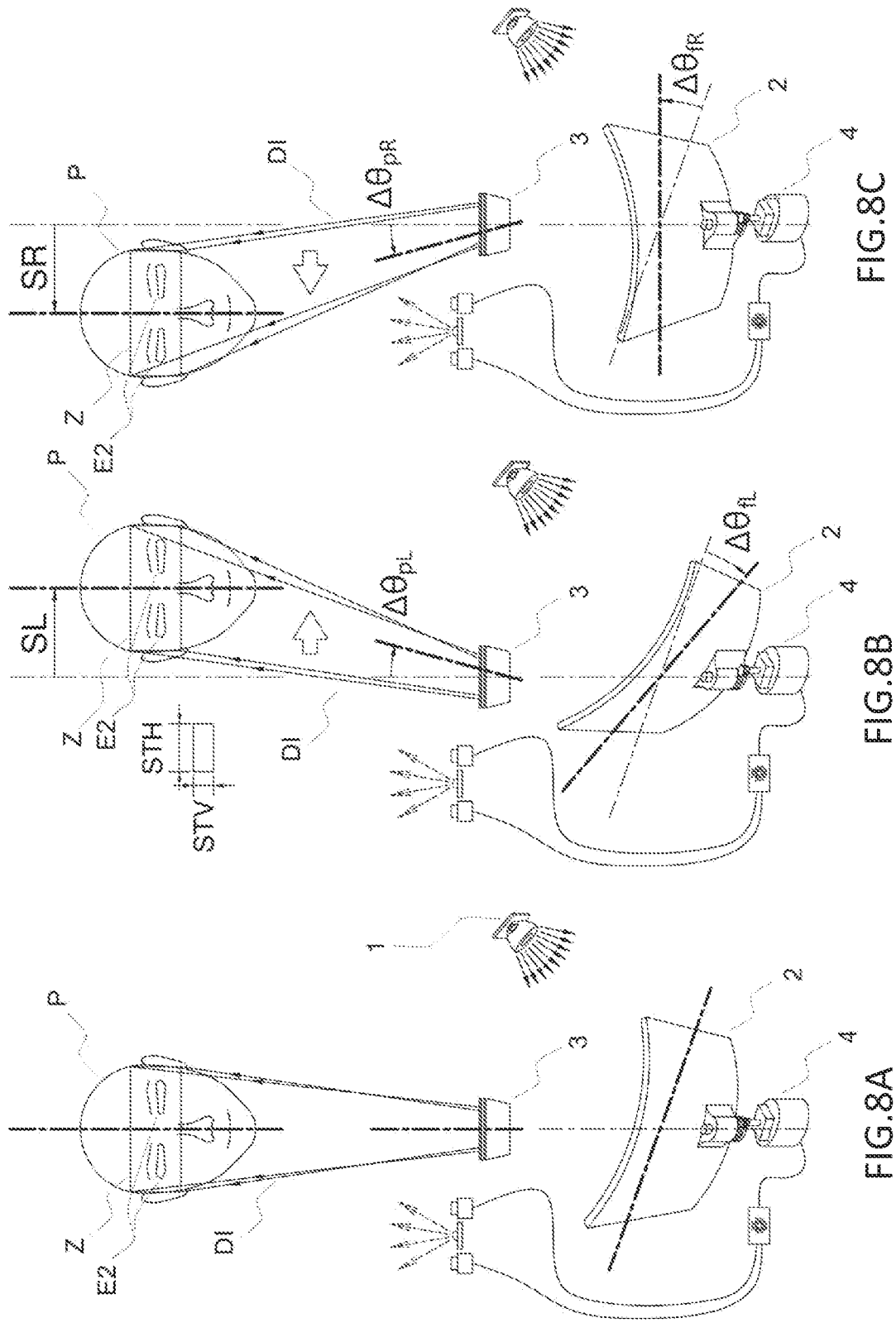
FIG. 8A, FIG. 8B and FIG. 8C are schematic diagrams a both-eyed tracking according to some embodiment of the present disclosure.

Please refer to FIG. 8A, a range of the projection area (the eye box Z) covers both eyes E2, the reflective narrow-angle diffuser 2 reflecting to provide the uniform directional light beam, the uniform directional light beam penetrating the backlit display device panel 3 to provide the uniform directional image light beam DI, the center of the projection area Z being located at the center of eyes E2 of the observer P. Please refer to FIG. 8B, when the eye tracking device 5 detects both eyes E2 of the observer P moving to left at a distance SL and the distance SL is greater than a horizontal shifting threshold STH, e.g., 3 cm, the drive module 4 driving the reflective narrow-angle diffuser 2 to rotate to left at $\Delta\theta_{fL°}$, the uniform directional image light beam DI penetrating the backlit display device panel 3 turning left at $\Delta\theta_{pL°}$, maintaining the center of the projection area Z at the center of both eyes E2 of the observer P (i.e., an center coordinate). Please refer to FIG. 8C, when the eye tracking device 5 detects both eyes E2 of the observer P moving to right at a distance SR, the drive module 4 driving the reflective narrow-angle diffuser 2 to rotate to right at $\Delta\theta_{fR°}$, the uniform directional image light beam DI penetrating the backlit display device panel 3 turning right at $\Delta\theta_{pR°}$, maintaining the center of the projection area Z at the center of both eyes E2 of the observer P (i.e., the center coordinate). In this way, the eye tracking device 5 keeps detecting and tracking changes of the position of both eyes E2 of the observer P to adjust the projecting position of the eye box Z, so that the image viewed by the observer P is continuous.

Figure 9:
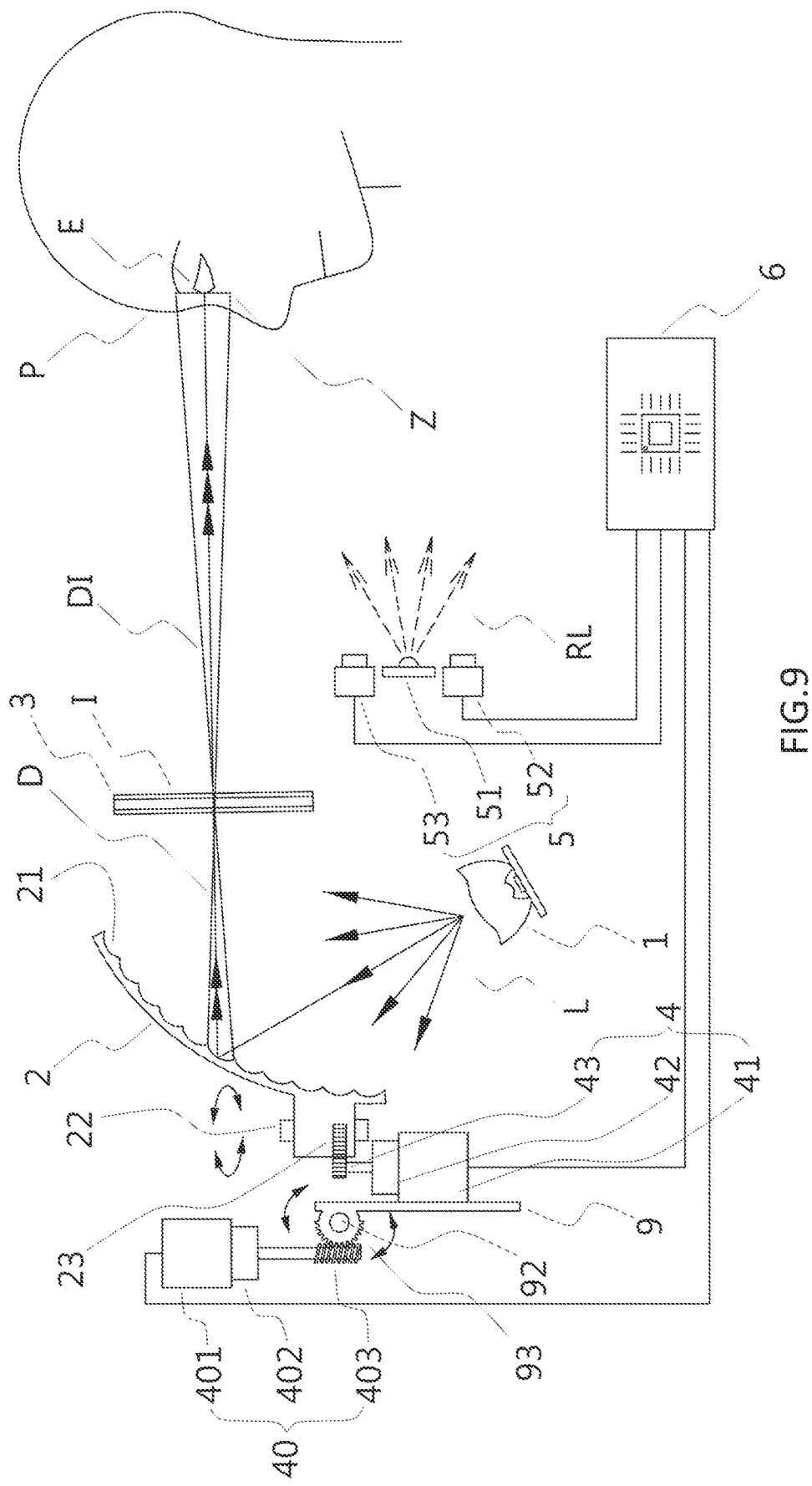
FIG. 9 is a schematic diagram according to some embodiment of the present disclosure.

Please refer to FIG. 9, according to some embodiment of the present disclosure, there is provided a directional backlit display device with eye tracking comprising a base 9 and a second drive module 40. The reflective narrow-angle diffuser 2 and the drive module 4 are installed on the base 9. The base 9 comprises a second shaft 92 and a second input gear 93. The second drive module 40 comprises a second motor 401 and a second reduction gear assembly 402. The second motor 401 engages with the second reduction gear assembly 402. The second reduction gear assembly 402 comprises a second output gear 403. The second output gear 403 meshes with the second input gear 93 of the base 9. The second motor 401 drives the second output gear 403 with the second reduction gear assembly 402, so the reflective narrow-angle diffuser 2 rotates around an axis of the second shaft 92 of the base 9.

In some embodiment, the reflective narrow-angle diffuser 2 rotates around the axis of the shaft 22 and the axis of the second shaft 92 simultaneously.

Figure 10:
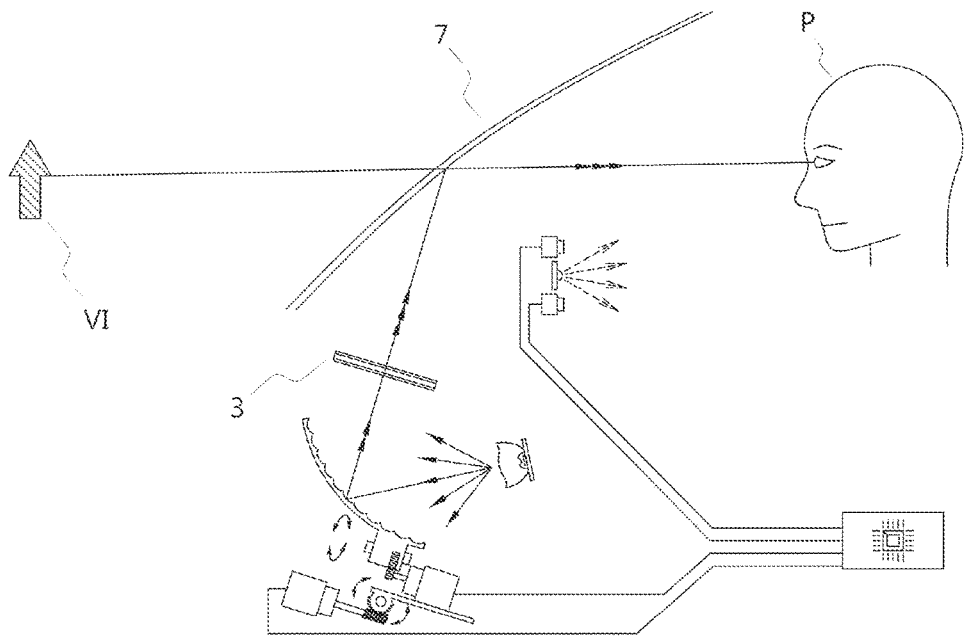
FIG. 10 is a schematic diagram according to some embodiment of the present disclosure.

Please refer to FIG. 10, according to some embodiment of the present disclosure, there is provided a directional backlit display device with eye tracking comprising a windshield 7 being positioned between the observer P and the backlit display device panel 3 in a projecting optical path. The windshield 7 blends a virtual image VI and a scenery in front of the observer P, so the observer P sees both the virtual image VI and the scenery in the front simultaneously.

Figure 11:
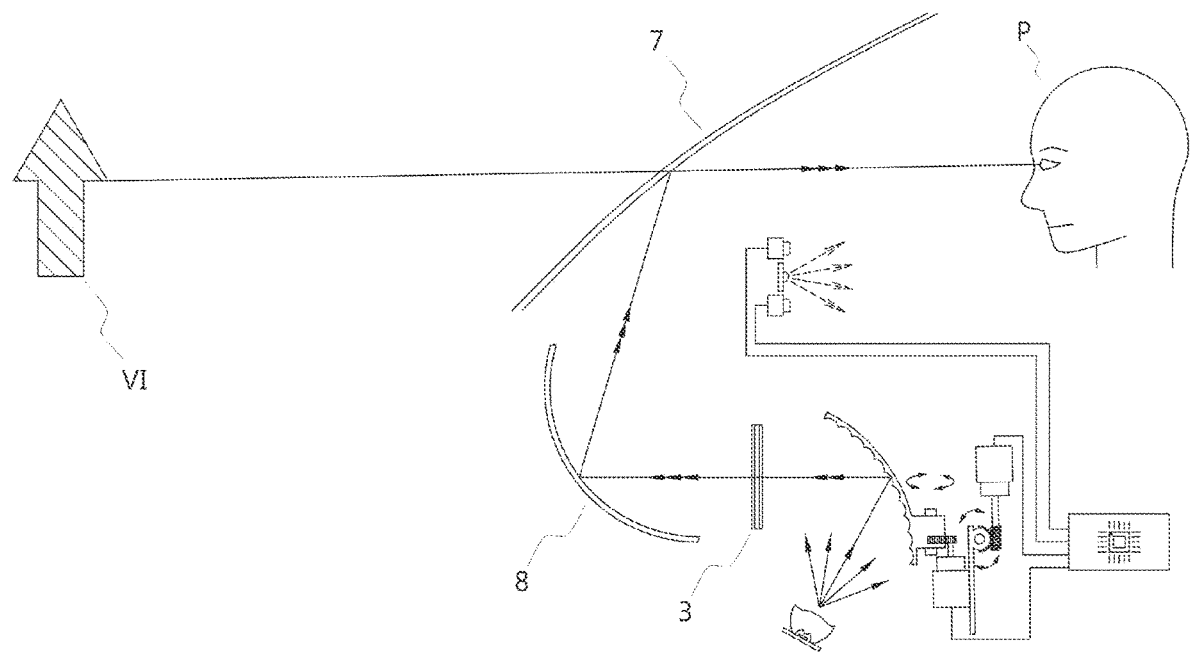
FIG. 11 is a schematic diagram according to some embodiment of the present disclosure.

Please refer to FIG. 11, according to some embodiment of the present disclosure, there is provided a directional backlit display device with eye tracking comprising a concave mirror 8 being positioned between the windshield 7 and the backlit display device panel 3 in a projecting optical path, the backlit display device panel 3 displaying the uniform directional image light beam DI, and then the uniform directional image light beam DI is reflected by the concave mirror 8 and the windshield 7. The concave mirror 8 herein is utilized to magnify the virtual image VI and lengthening a virtual image distance.

In some embodiment, the output gear, the input gear, the second output gear, and the second input gear are parallel shaft gears, i.e. a spur gear (in FIG. 12A), a helical gear (in FIG. 12B), a rack (in FIG. 12C), a helical rack (in FIG. 12D), an internal gear (in FIG. 12E), a helical internal gear (in FIG. 12F), or intersecting shaft gears, i.e., straight bevel gear (in FIG. 12G), a helical bevel gear (in FIG. 12H), or staggered shaft gears, i.e., a screw gear (in FIG. 12I), a worm or a worm wheel (in FIG. 12J).

Figure 13A:
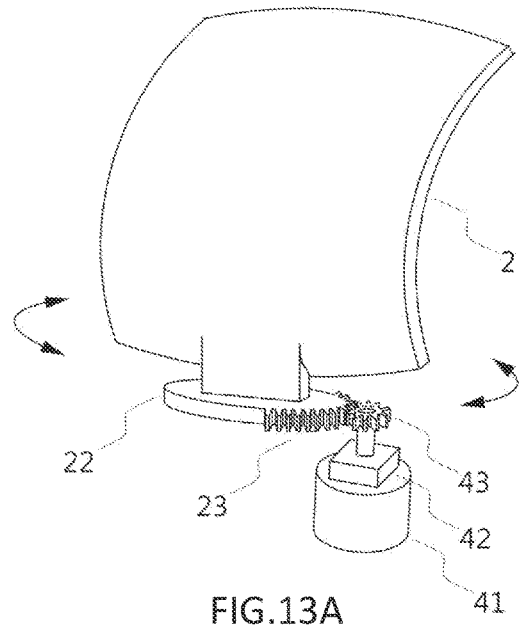
FIG. 13A, FIG. 13B, FIG. 13C and FIG. 13D are schematic diagrams of a single shaft gear transmission.

Please refer to FIG. 13A, the reflective narrow-angle diffuser 2 comprises a shaft 22 in a horizontal direction, the output gear 43 being a spur gear, the input gear 23 being an edge spur gear. The motor 41 drives the spur gear with the reduction gear assembly 42, driving the edge spur gear of the shaft to rotate the reflective narrow angle diffuser 2 horizontally.

Figure 13B:
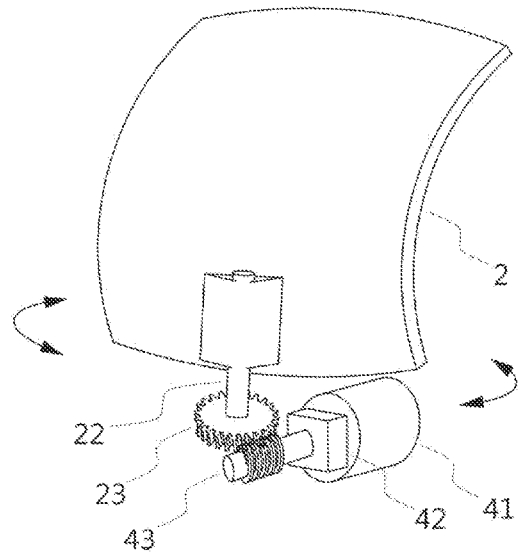

Please refer to FIG. 13B, the output gear 43 is a worm, the input gear 23 being a worm wheel of the shaft 22. The motor 41 drives the worm with the reduction gear assembly 42, driving the worm wheel of the shaft 22 to rotate the reflective narrow angle diffuser 2 horizontally.

Figure 13C:
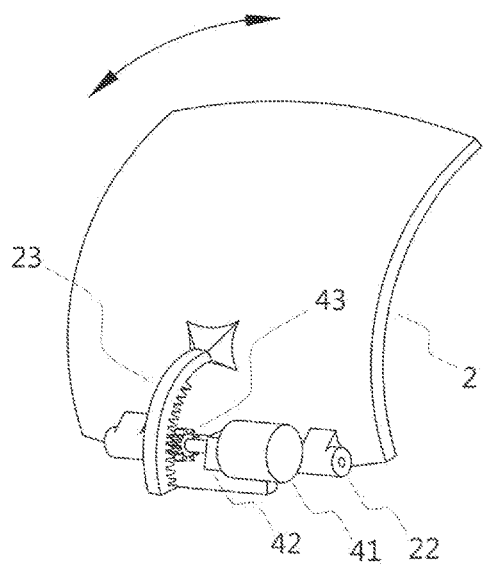

Please refer to FIG. 13C, the reflective narrow-angle diffuser 2 comprises a shaft 22 in a perpendicular direction, the output gear 43 being a spur gear, the input gear 23 being an internal curved rack disposed on the reflective narrow-angle diffuser 2. The motor 41 drives the spur gear with the reduction gear assembly 42, driving the internal curved rack of the shaft 22 to rotate the reflective narrow angle diffuser 2 perpendicularly.

Figure 13D:
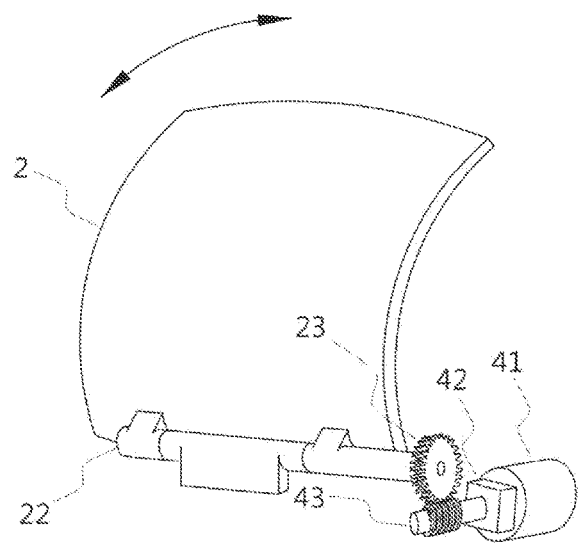

Please refer to FIG. 13D, the output gear 43 being a worm, the input gear 23 being a worm wheel of the shaft 22. The motor 41 drives the worm with the reduction gear assembly 42, driving the worm wheel of the shaft 22 to rotate the reflective narrow angle diffuser 2 perpendicularly.

Figure 14A:
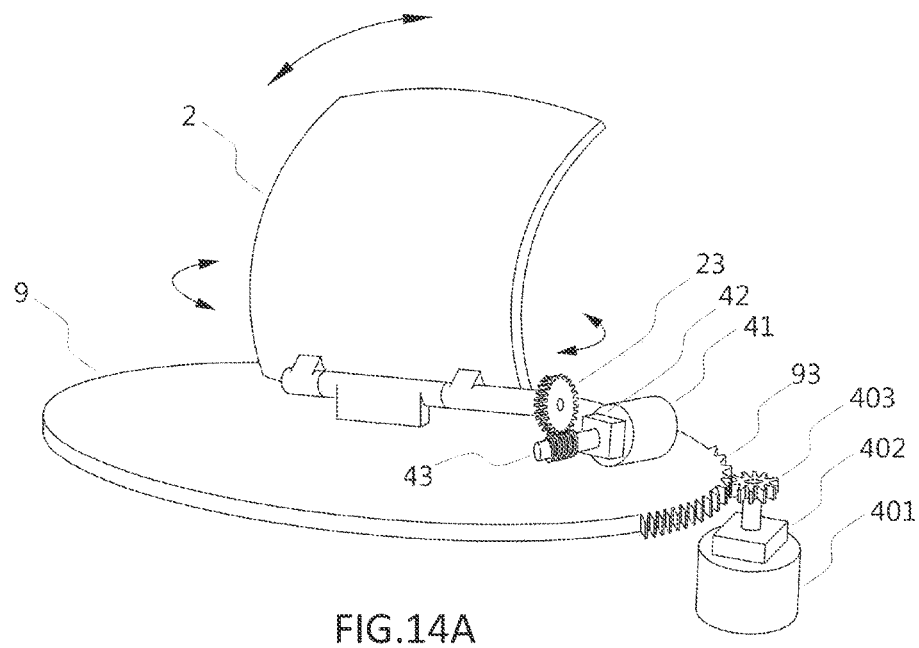
FIG. 14A, FIG. 14B and FIG. 14C are schematic diagrams of a dual shaft gear transmission.

Please refer to FIG. 14A, the reflective narrow-angle diffuser 2 comprises a dual shaft in a horizontal and a perpendicular direction, the output gear 43 being a worm, the input gear 23 being a worm wheel of the shaft in a perpendicular direction. The motor 41 drives the worm with the reduction gear assembly 42, driving the worm wheel of the shaft to rotate the reflective narrow angle diffuser 2 perpendicularly. The second output gear 403 being a spur gear, the second input gear 93 being a spur gear of the shaft of the base 9 in a horizontal direction. The second motor 401 drives the spur gear with the second reduction gear assembly 402, driving the spur gear of the shaft of the base 9 in the horizontal direction to rotate the reflective narrow-angle diffuser 2 horizontally.

Figure 14B:
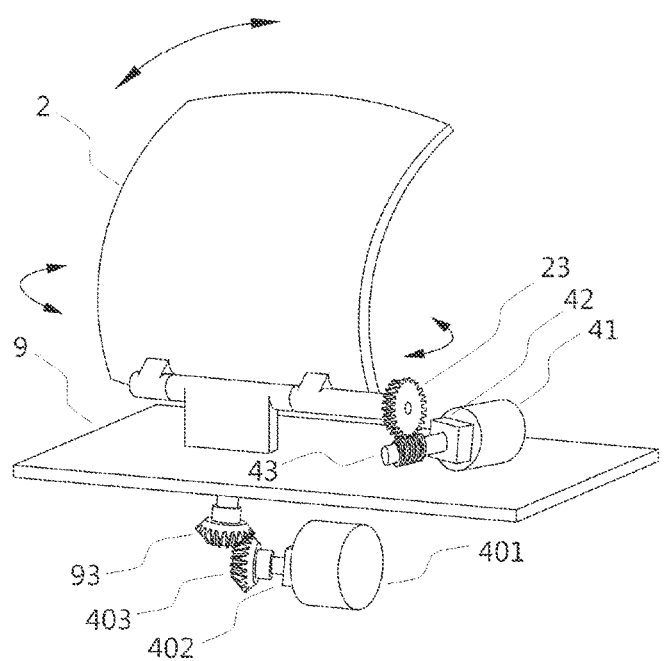

Please refer to FIG. 14B, the output gear 43 is a worm, the input gear 23 being a worm wheel of the shaft in a perpendicular direction. The motor 41 drives the worm with the reduction gear assembly 42, driving the worm wheel of the shaft in the perpendicular direction to rotate the reflective narrow angle diffuser 2 perpendicularly. The second output gear 403 being a straight bevel gear, the second input gear 93 being a straight bevel gear of the shaft of the base 9 in a horizontal direction. The second motor 401 drives the straight bevel gear with the second reduction gear assembly 402, driving the straight bevel gear of the shaft of the base 9 in the horizontal direction to rotate the reflective narrow-angle diffuser 2 horizontally.

Figure 14C:
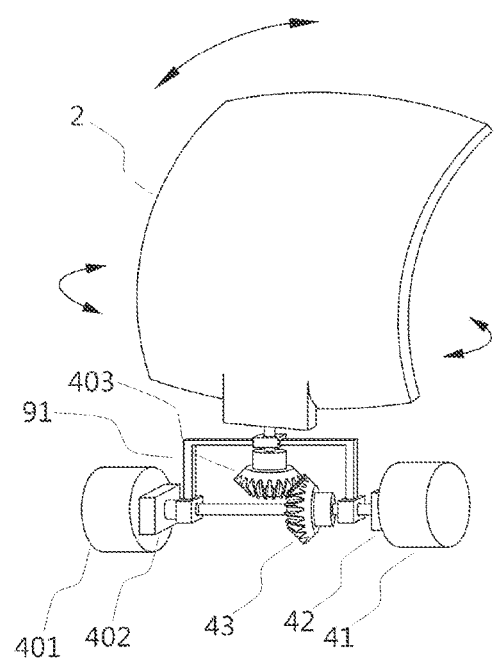

Please refer to FIG. 14C, a motor 41 and a second motor 401 are utilized to drive two bevel gears 43, 403, a first bevel gear 43 meshing with a second bevel gear 403, the motors 41, 401 being included on the same axis. The motor 41 drives the first bevel gear 43 on the axis with the reduction gear assembly 42. The second motor 401 drives a frame 91 via the second reduction gear assembly 402. The frame 91 comprises the second bevel gear 403, so the second bevel gear 403 rotates on the frame 91. The second bevel gear 403 is linked with the reflective narrow-angle diffuser 2. When the motor 41 rotates, the second motor 401 stops rotating, the frame 91 being motionless. The motor 41 drives the first bevel gear 43 with the reduction gear assembly 42, driving the second bevel gear 403 and the reflective narrow-angle diffuser 2 to rotate horizontally. When the motor 41 and the second motor 401 rotate at the same speed and direction, the first bevel gear 43 and the second bevel gear 403 rotate without related rotation. The frame 91 drives the reflective narrow-angle diffuser 2 to rotate perpendicularly. When the motor 41 and the second motor 401 rotate at various speeds, the first bevel gear 43 and the second bevel gear 403 rotate with related rotation. The second bevel gear 403 drives the reflective narrow-angle diffuser 2 to rotate horizontally. the frame 91 drives the reflective narrow-angle diffuser 2 to rotate perpendicularly.

In some embodiment, the output gear, the input gear, the second output gear and the second input gear are replaced with a pulley and a flexible transmission element. The flexible transmission element is belts, ropes or chains.

Figures 15A, 15B:
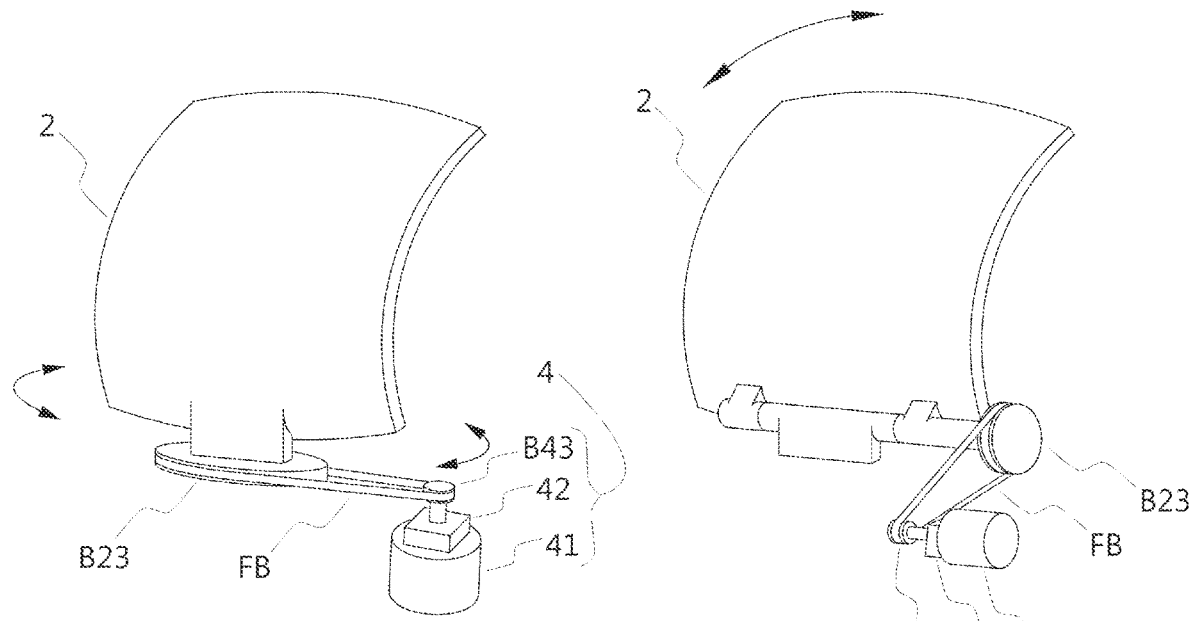
FIG. 15A, FIG. 15B and FIG. 15C are schematic diagrams of a flexible transmission.

Please refer to FIG. 15A, the reflective narrow-angle diffuser 2 comprises a shaft in a horizontal direction and the drive module 4, an output pulley B43 of the drive module 4 engaging with an input pulley B23 of the reflective narrow-angle diffuser 2 with a flexible belt FB. The motor 41 drives the output pulley B43 with the reduction gear assembly 42, the output pulley B43 driving the input pulley B23 with the flexible belt FB, the input pulley driving the reflective narrow-angle diffuser 2 to rotate horizontally.

Please refer to FIG. 15B, the reflective narrow-angle diffuser 2 comprises a shaft in a perpendicular direction and the drive module 4, an output pulley B43 of the drive module 4 engaging with an input pulley B23 of the reflective narrow-angle diffuser 2 with a flexible belt FB. the motor 41 drives the output pulley B43 with the reduction gear assembly 42, the output pulley B43 driving the input pulley B23 with the flexible belt FB, the input pulley driving the reflective narrow-angle diffuser 2 to rotate perpendicularly.

Figure 15C:
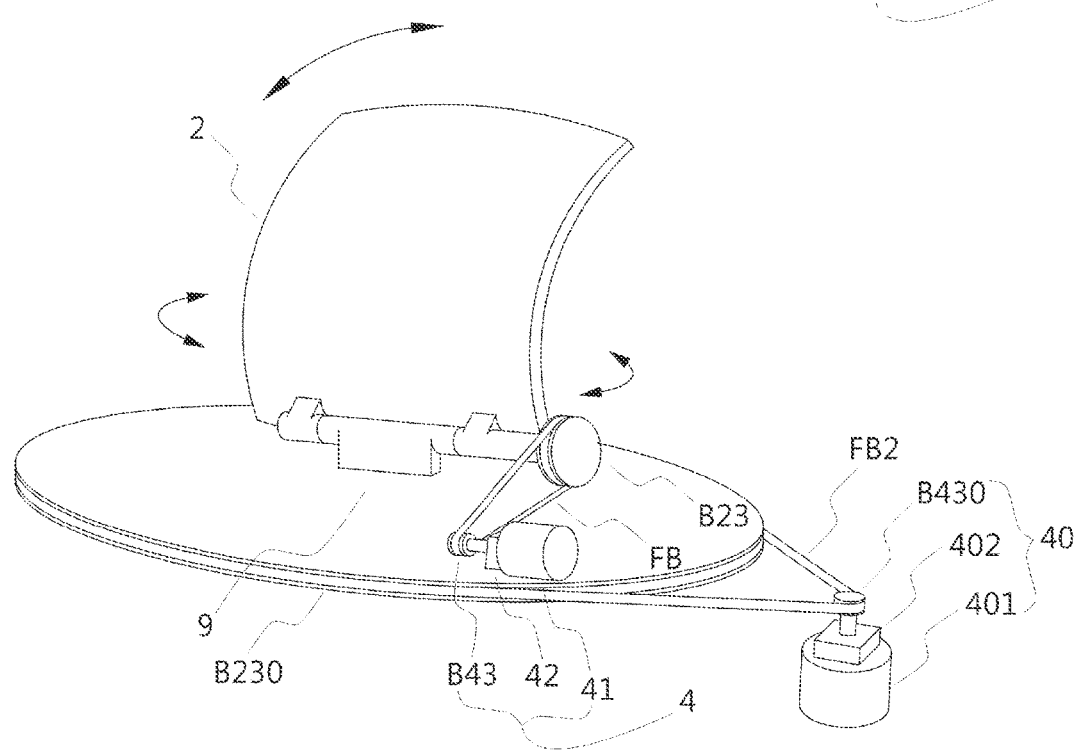

Please refer to FIG. 15C, the reflective narrow-angle diffuser 2 comprises a dual shaft in a horizontal and a perpendicular direction, an output pulley B43 of the drive module 4 engaging with an input pulley B23 of the reflective narrow-angle diffuser 2 by a flexible belt FB. the motor 41 drives the output pulley B43 with the reduction gear assembly 42, the output pulley B43 driving the input pulley B23 with the flexible belt FB, the input pulley driving the reflective narrow-angle diffuser 2 to rotate perpendicularly. A second output pulley B430 of the second drive module 40 engages with a second input pulley B230 of the base 9 with a second flexible belt FB2. The second motor 401 drives the second output pulley B430 with the second reduction gear assembly 402, the second output pulley B430 driving the second input pulley B230 with the second flexible belt FB2, the second input pulley B230 driving the reflective narrow-angle diffuser 2 to rotate horizontally.

Figure 16A:
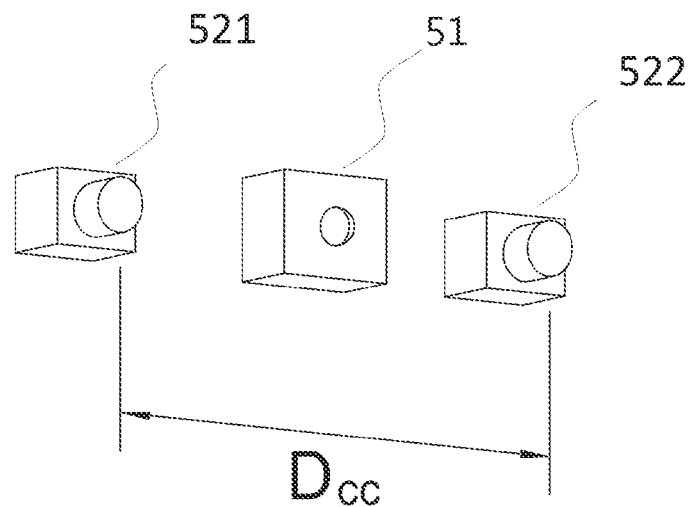
FIG. 16A and FIG. 16B are schematic diagrams of an eye tracking device.
Figure 16B:
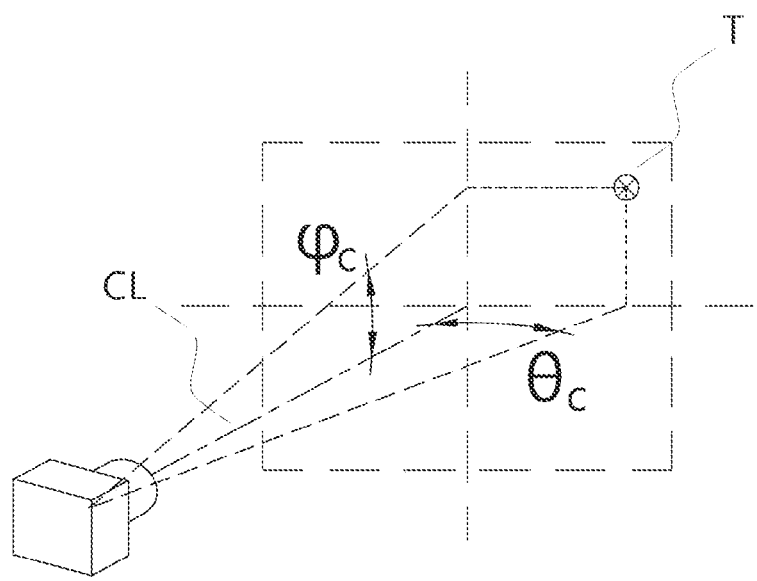

Please refer to FIG. 16A, the eye tracking device 5 comprises an infrared light source 51 provided with two infrared cameras 521, 522 spaced apart in a horizontal direction, the two infrared cameras 521, 522 being spaced at a distance Dcc. Please refer to FIG. 16B, a conical coordinate system being utilized to define each image from the infrared cameras, obtaining a horizontal angle θc of a target T and the centerline CL of the infrared camera being captured, or a perpendicular angle φc of the target T and the centerline CL of the infrared camera being captured. It is not possible to acquire the distance between the target T and the infrared camera.

Figure 17A:
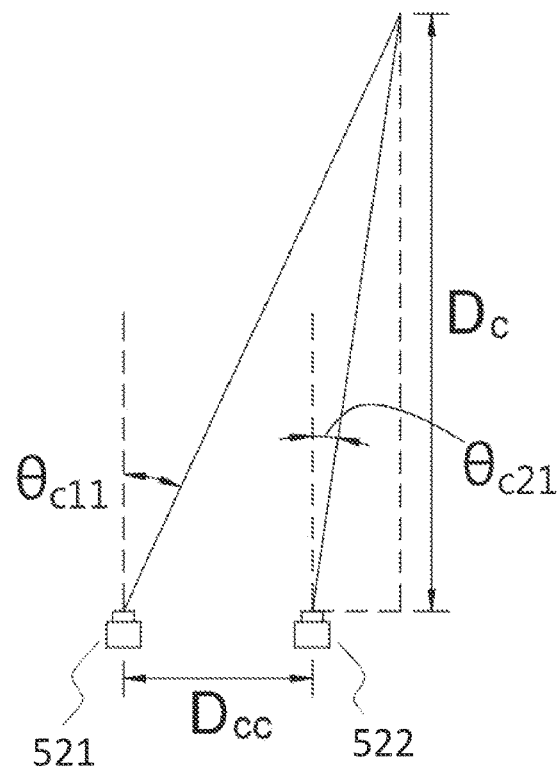
FIG. 17A and FIG. 17B are schematic diagrams illustrating determining a position of moving eyes.

Please refer to FIG. 17A, the two infrared cameras 521, 522 spaced apart in the horizontal direction at a distance Dcc is utilized to determine the centerlines of the two infrared cameras and the horizontal angles θ c11 and θ c21 of the right eye of the observer, the Trigonometric functions as below determining a longitudinal distance Dc between the right eye of the observer and the infrared camera. That is, the equalities $$D_c = \frac{D_{cc} \sin\left(\frac{\pi}{2} - \theta_{c11}\right) \sin\left(\frac{\pi}{2} + \theta_{c21}\right)}{\sin(\pi - \theta_{c11} + \theta_{c21})}$$

Figure 17B:
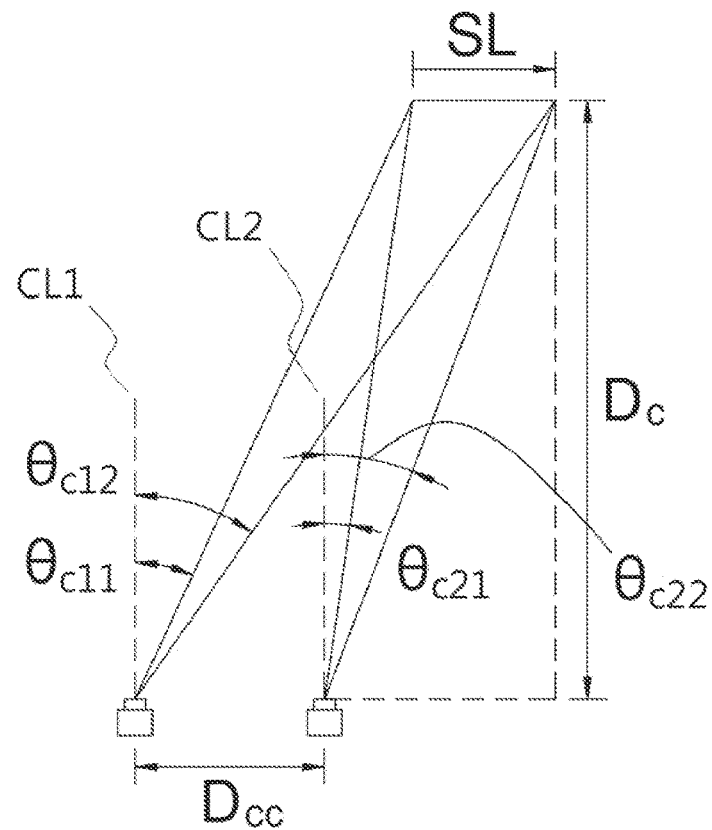

Please refer to FIG. 17B, when the right eye of the observer moves to left at a distance SL, the centerlines $C_{L1}$, $C_{L2}$ and the horizontal angles θ c12 and θ c22 of the right eye of the observer is determined, the Trigonometric functions as below determining a distance SL which the right eye of the observer moves. That is, the equalities $$SL = D_c\left[\tan\left(\frac{\pi}{2} - \theta_{c12}\right) - \tan\left(\frac{\pi}{2} - \theta_{c11}\right)\right] = D_c\left[\tan\left(\frac{\pi}{2} - \theta_{c22}\right) - \tan\left(\frac{\pi}{2} - \theta_{c21}\right)\right]$$

Please refer to FIG. 18A, the longitudinal distance between the infrared cameras 521, 522 and the backlit display device panel 3 is a, so the longitudinal distance between the right eye of the observer and the backlit display device panel 3 are determined as Dp.

$$D_p = D_c + \alpha$$

Please refer to FIG. 18B, the horizontal angle between the central axis CLP of the backlit display device panel 3 and the projected image light to the right eye of the observer is θ p1. When the right eye of the observer moves to left at the distance SL, the longitudinal distance Dp between the right eye of the observer and the backlit display device panel 3 is utilized, a required horizontal angle θ p2 for the projected right-eye image light that the observer moves to left at the distance SL being determined.

$$\theta_{p2} = \tan^{-1}\left(\frac{SL}{D_p} + \tan\theta_{p1}\right)$$

Please refer to FIG. 18C, a required turning angle Δθp for the projected image light of the backlit display device panel 3 is determined.

$$\Delta\theta_p = \theta_{p2} - \theta_{p1}$$

According to the optical lever of the specular reflection, when the injecting light is unchanged, the mirror rotates at an angle α, the reflected light changes at an angle 2α, a required rotating horizontal angle Δθf for the reflective narrow-angle diffuser is determined.

$$\Delta\theta_f = \frac{\Delta\theta_p}{2}$$

In some embodiment, one of the infrared cameras of the eye tracking device 5 is replaced with a distance sensor. The distance sensor uses infrared, ultrasonic or millimeter wave to detect the head of the observer. The infrared light source projects an infrared light to the observer, the infrared camera capturing the reflected infrared light by the observer, providing an infrared image to the controller, the distance sensor receiving a distance between the head of the observer and the distance sensor and provide the distance to the controller, the image recognition and the location coordinate algorithm of the controller are utilized to determine the coordinate of the eyes of the observer, obtaining the required rotating horizontal angle for the reflective narrow-angle diffuser.

Figure 19:
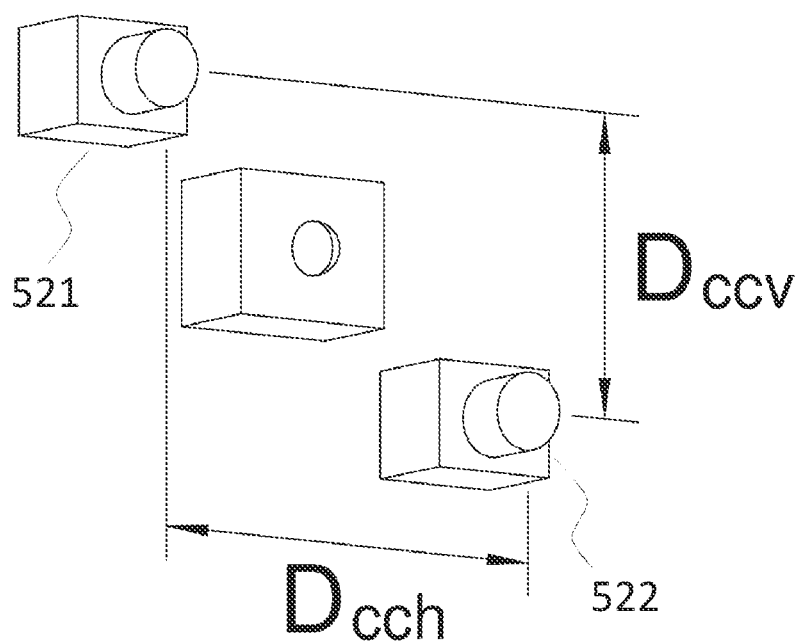
FIG. 19 is another schematic diagram of the eye tracking device.

The aforementioned embodiments only explain detecting the amount of movement accurately in the horizontal direction. In order to detect the amount of movement accurately in the perpendicular direction, please refer to FIG. 19, the two infrared cameras 521, 522 of the eye tracking device are spaced apart at a horizontal distance Dcch and at a perpendicular distance Dccv.

In this way, the amount of movement of the eyes in the horizontal direction and perpendicular direction is detected, the required rotating horizontal and perpendicular angle being determined, so the drive module controls the rotating angle of the reflective narrow-angle diffuser, maintaining the center of the projection area at eyes of the observer, the image viewed by the observer being continuous.

Figure 20A:
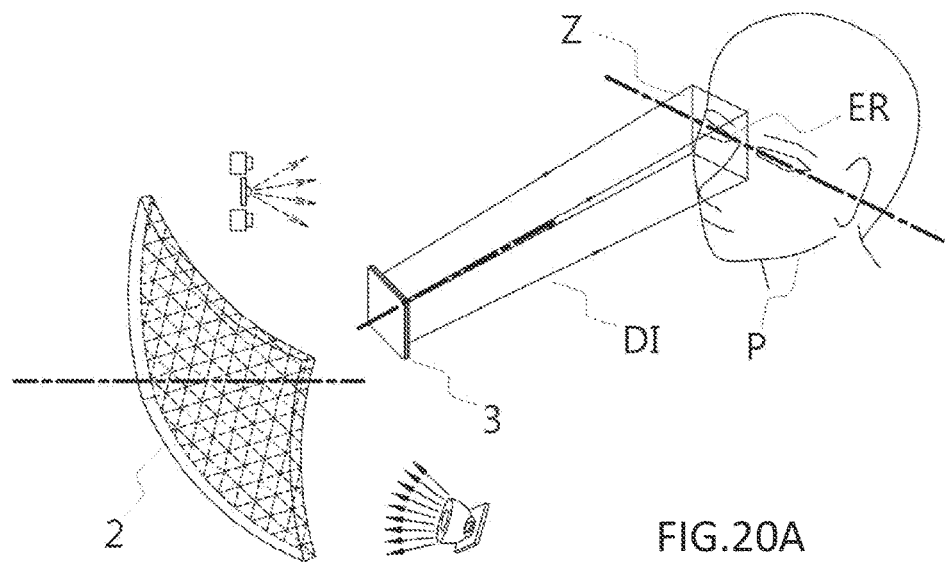
FIG. 20A, FIG. 20B and FIG. 20C are schematic diagrams illustrating perpendicular tracking of a projection area.

Please refer to FIG. 20A, the reflective narrow-angle diffuser 2 reflects and diffuses the uniform directional light beam, the uniform directional light beam penetrating the backlit display device panel 3 to provide the uniform directional image light beam DI, the center of the projection area Z being the right eye ER of the observer P.

Figure 20B:
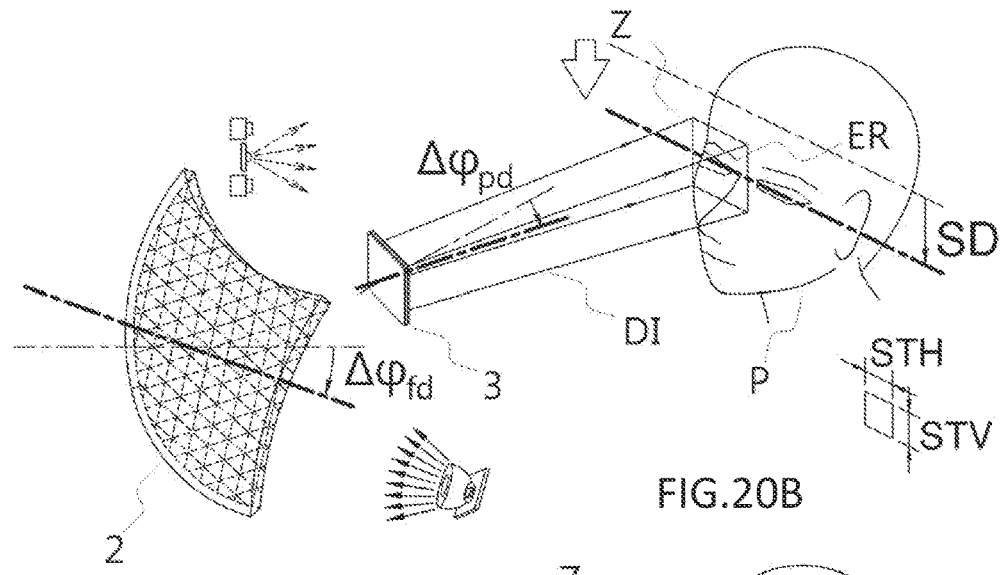

Please refer to FIG. 20B, when the right eye ER of the observer moving downward at a distance SD is detected, the drive module rotates the reflective narrow-angel diffuser 2 downward at an angle Δϕfd, the uniform directional image light beam penetrating the backlit display device panel 3 turning downward at an angle Δϕpd, maintain the center of the projection area Z at the right eye ER of the observer P.

Figure 20C:
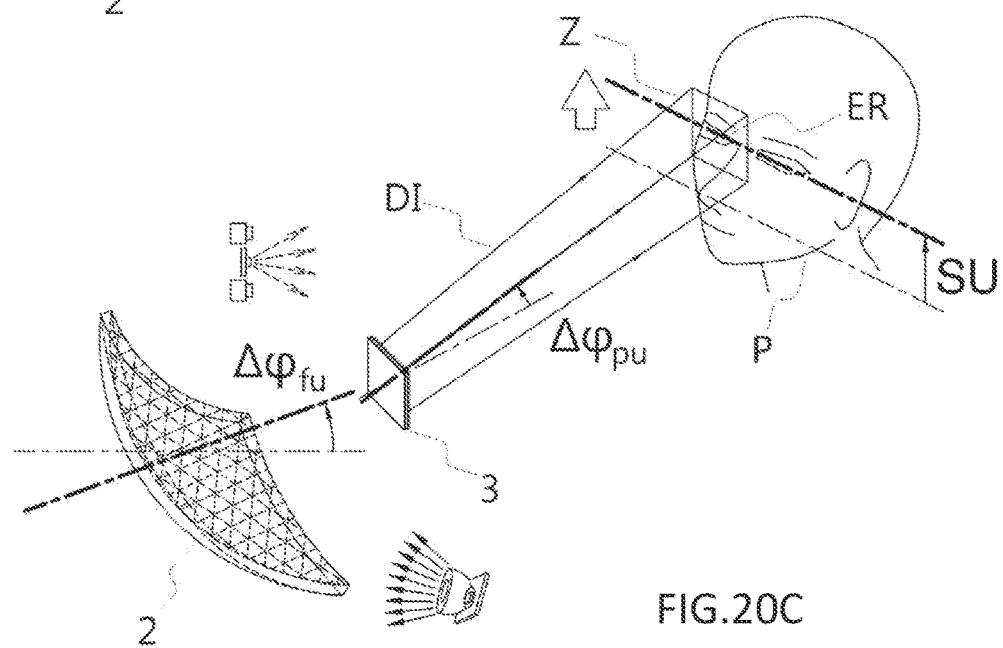

Please refer to FIG. 20C, when the right eye ER of the observer moving upward at a distance SU is detected, the drive module rotates the reflective narrow-angel diffuser 2 upward at an angle Δϕfu, the uniform directional image light beam penetrating the backlit display device panel 3 turning upward at an angle Δϕpu, maintain the center of the projection area Z at the right eye ER of the observer P.

By continuously detecting and tracking various positions of the eyes of the observer to adjust the projecting position of the projection area, it is like expanding the eye box to various positions, so the image viewed by the observer is continuous.

What is claimed is:

1. A directional backlit display device with eye tracking comprising:
   a light source module, projecting a light;
   a reflective narrow-angle diffuser, including a shaft and a plurality of micro curved mirrors, wherein the shaft is controlled by a drive module, the plurality of micro curved mirrors being laid out in an array,
   wherein the reflective narrow-angle diffuser reflects the light and uniformly diffuses the light with a narrow diffusion angle to provide a uniform directional light beam;
   a backlit display device panel, being included in a projecting optical path of the reflective narrow-angle diffuser,
   wherein the backlit display device panel displays an image,
   wherein the uniform directional light beam penetrates the backlit display device panel to provide a uniform directional image light beam,
   wherein the uniform directional image light beam projects to a projection area, an eye tracking device;

a controller, receiving an eye position information from the eye tracking device, and then determining an eye coordinate, wherein the controller determines a corrective projection area according to a deviation between the eye position information and a center of the projection area, wherein the uniform directional image light beam projects to the corrective projection area based on the rotation of the reflective narrow-angle diffuser around an axis of the shaft, wherein the reflective narrow-angle diffuser controlled by the drive module changes an angle at which the light of the light source module projects to the reflective narrow-angle diffuser, so the uniform directional image light beam projects to the corrective projection area, wherein in a range of the rotation of the reflective narrow-angle diffuser around the axis of the shaft, the projecting area of the uniform directional image light beam is larger than a whole size of the backlit display device panel.

2. The directional backlit display device with eye tracking of claim 1, wherein the eye tracking device provides the eye position information based on detecting both eyes of one observer, wherein the controller determines a center coordinate of the both eyes, wherein the controller determines the corrective projection area when the center coordinate of the both eyes deviates from the center of the projection area.

3. The directional backlit display device with eye tracking of claim 1, wherein the controller determines the corrective projection area according to the eye coordinate when a deviation between the eye coordinate and the center of the projection area exceeds a preset threshold.

4. The directional backlit display device with eye tracking of claim 1, wherein the reflective narrow-angle diffuser and the drive module are installed on a base, wherein the base includes a second shaft being controlled by a second drive module.

5. The directional backlit display device with eye tracking of claim 4, wherein the reflective narrow-angle diffuser rotates around an axis of the shaft and an axis of the second shaft simultaneously.

6. The directional backlit display device with eye tracking of claim 4, wherein the base comprises an input gear meshing with an output gear set of the second drive module.

7. The directional backlit display device with eye tracking of claim 4, wherein the base comprises an input pulley, wherein the input pulley spins via a flexible transmission element engaging to an output pulley, wherein the output pulley is driven by the second drive module.

8. The directional backlit display device with eye tracking of claim 1, further comprising a windshield, being included in the projecting optical path of the uniform directional image light beam.

9. The directional backlit display device with eye tracking of claim 8, further comprising a concave mirror, being positioned between the windshield and the backlit display device panel in the projecting optical path of the uniform directional image light beam.

10. The directional backlit display device with eye tracking of claim 1, wherein the reflective narrow-angle diffuser comprises an input gear meshing with an output gear set of the drive module.

11. The directional backlit display device with eye tracking of claim 1, wherein the reflective narrow-angle diffuser comprises an input pulley, wherein the input pulley spins via a flexible transmission element engaging to an output pulley, wherein the output pulley is driven by the drive module.

12. The directional backlit display device with eye tracking of claim 1, wherein the eye position information includes two infrared image signals.

13. The directional backlit display device with eye tracking of claim 1, wherein the eye position information includes an infrared image signal and a distance signal.

* * * * *